(12) United States Patent
Yuan et al.

(10) Patent No.: US 11,128,420 B2
(45) Date of Patent: Sep. 21, 2021

(54) REFERENCE SIGNAL SENDING METHOD, BASE STATION, AND USER EQUIPMENT

(71) Applicant: HUAWEI TECHNOLOGIES CO., LTD., Guangdong (CN)

(72) Inventors: Pu Yuan, Shanghai (CN); Jun Luo, Kista (SE); Jin Liu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/657,759

(22) Filed: Oct. 18, 2019

(65) Prior Publication Data

US 2020/0052850 A1 Feb. 13, 2020

Related U.S. Application Data

(63) Continuation of application No. PCT/CN2018/080558, filed on Mar. 26, 2018.

(30) Foreign Application Priority Data

Apr. 21, 2017 (CN) .......................... 201710267751.3

(51) Int. Cl.
*H04L 5/00* (2006.01)
*H04W 72/04* (2009.01)

(52) U.S. Cl.
CPC ......... *H04L 5/0048* (2013.01); *H04W 72/042* (2013.01); *H04W 72/044* (2013.01)

(58) Field of Classification Search
CPC .. H04L 5/0048; H04W 72/042; H04W 72/044
See application file for complete search history.

(56) References Cited

U.S. PATENT DOCUMENTS

2010/0272035 A1* 10/2010 Park .................. H04W 8/00
2010/0272059 A1* 10/2010 Bienas ................ H04B 7/216
(Continued)

FOREIGN PATENT DOCUMENTS

| CN | 101483927 A | 7/2009 |
| CN | 101790169 A | 7/2010 |

(Continued)

OTHER PUBLICATIONS

3GPP TSG RAN WG1 Meeting #88 bis,R1-1704347: CSI-RS design Principle ATandT Apr. 3-7, 2017 Spokane, USA total 4 pages.

*Primary Examiner* — Ronald B Abelson
(74) *Attorney, Agent, or Firm* — Womble Bond Dickinson (US) LLP

(57) ABSTRACT

This application discloses a reference signal sending method, a base station, and user equipment, to relieve a problem of low utilization of time-frequency resources. The method may include receiving, by a base station, a measurement result, sent by user equipment (UE), of a downlink reference signal from a serving cell of the UE, where the base station is a base station to which the serving cell belongs. The method may also include determining, by the base station based on the measurement result, whether a predetermined handover preparation condition is met. When the predetermined handover preparation condition is met, the method may include instructing, by the base station, a neighboring cell to send the downlink reference signal to the UE using a time-frequency resource configured by the base station, where the neighboring cell does not send the downlink reference signal to the UE before the neighboring cell is instructed. Furthermore, the method may include instructing, by the base station, the UE to receive the downlink (Continued)

reference signal using the time-frequency resource configured by the base station.

11 Claims, 11 Drawing Sheets

(56) References Cited

U.S. PATENT DOCUMENTS

| | | | |
|---|---|---|---|
| 2011/0007673 A1* | 1/2011 | Ahn | H04J 3/00 |
| 2011/0080825 A1* | 4/2011 | Dimou | H04L 12/26 |
| 2012/0106349 A1* | 5/2012 | Adjakple | H04W 36/22 |
| 2014/0018082 A1 | 1/2014 | Cheng et al. | |
| 2014/0362793 A1 | 12/2014 | Chai et al. | |
| 2015/0103800 A1* | 4/2015 | Seo | H04W 48/10 |
| 2015/0229379 A1 | 8/2015 | Zhang et al. | |
| 2016/0037425 A1 | 2/2016 | Van Lieshout et al. | |
| 2018/0220406 A1* | 8/2018 | Mizusawa | H04W 72/04 |
| 2019/0082346 A1* | 3/2019 | Tang | H04W 24/10 |

FOREIGN PATENT DOCUMENTS

| | | | |
|---|---|---|---|
| CN | 102685826 A | 9/2012 | |
| CN | 103313250 A | 9/2013 | |
| CN | 103841632 A | 6/2014 | |
| EP | 2919518 A1 | 9/2015 | |
| WO | 2014183647 A1 | 11/2014 | |

\* cited by examiner

REFERENCE SIGNAL SENDING METHOD, BASE STATION, AND USER EQUIPMENT

CROSS-REFERENCE TO RELATED APPLICATIONS

This application is a continuation of International Application No. PCT/CN2018/080558, filed on Mar. 26, 2018, which claims priority to Chinese Patent Application No. 201710267751.3, filed on Apr. 21, 2017. The disclosures of the aforementioned applications are hereby incorporated by reference in their entireties.

TECHNICAL FIELD

This application relates to the field of computers and communications technologies, and in particular, to a reference signal sending method, a base station, user equipment, and a network system.

BACKGROUND

To ensure various network service applications, a typical mobility management scenario is that, when user equipment (UE) in a radio resource control connected (e.g., Radio Resource Control CONNECTED, RRC_CONNECTED, or the like) state moves between cells, inter-cell handover needs to be performed in time to avoid losing a connection. Reference signal-based measurement is a basic operation in an inter-cell handover process. The UE measures, at a current location, a reference signal received power (RSRP) of a reference signal sent by each cell, and sends a measurement result to a base station. The base station determines, based on the received measurement result and a stored handover management algorithm, whether to perform inter-cell handover for the UE.

In a long term evolution (LTE) network, a reference signal bearing the foregoing function is a cell-specific reference signal (CRS). In the LTE network, the CRS is continuously sent and occupies a fixed time-frequency resource. Air interface resources are relatively strained between the base station and the UE, but a relatively large quantity of air interface resources are consumed in the existing CRS sending manner.

SUMMARY

Embodiments discussed in greater detail herein address the aforementioned problems.

According to a first aspect, a reference signal sending method is provided, including:
  receiving, by a base station, a measurement result, sent by UE, of a downlink reference signal from a serving cell of the UE, where the base station is a base station to which the serving cell belongs;
  determining, by the base station based on the measurement result, whether a predetermined handover preparation condition is met;
  if the predetermined handover preparation condition is met, instructing, by the base station, a neighboring cell to send the downlink reference signal to the UE by using a time-frequency resource configured by the base station, where the neighboring cell does not need to send the downlink reference signal to the UE before the neighboring cell is instructed; and
  instructing, by the base station, the UE to receive the downlink reference signal by using the time-frequency resource configured by the base station.

According to the reference signal sending method provided in this embodiment of this application, the neighboring cell does not need to send the downlink reference signal to the UE before obtaining the instruction of the base station to which the serving cell belongs. Before receiving the instruction, the neighboring cell may transmit other data by using the configured resource. According to the method, each cell does not need to continuously occupy a fixed time-frequency resource to send the downlink reference signal, so that fewer time-frequency resources are occupied for sending the downlink reference signal to the UE by a network side, thereby improving utilization of air interface resources.

In a possible embodiment, the instructing, by the base station, a neighboring cell to send the downlink reference signal to the UE by using a time-frequency resource configured by the base station includes:
  sending, by the base station, a notification message to the neighboring cell, where the notification message carries the time-frequency resource information, and the time-frequency resource information is used to indicate the configured time-frequency resource.

The base station to which the serving cell belongs notifies, through an X2 interface between base stations, a base station to which the neighboring cell belongs of the time-frequency resource information used for indicating the configured time-frequency resource, so that the neighboring cell sends the downlink reference signal to the UE by using the configured time-frequency resource. The time-frequency resource information includes time-domain resource information and frequency-domain resource information that are used for indicating an RE. The frequency-domain resource information is used to indicate a frequency-domain subcarrier to which the RE used for sending the downlink reference signal belongs, and the time-domain resource information is used to indicate a time-domain symbol to which the RE used for sending the downlink reference signal belongs.

The base station explicitly or implicitly instructs the neighboring cell to send the downlink reference signal to the UE by using the time-frequency resource configured by the base station. The explicit instruction manner includes notifying, through a channel such as a physical broadcast channel of the serving cell or dedicated RRC signaling, the UE of a time-frequency resource used by each of one or more neighboring cells. The explicit instruction manner has an advantage that through simple processing, the time-frequency resource that is notified by the network side can be rapidly learned of by the UE, so that a relatively small quantity of processing resources of the base station and the UE are consumed.

The implicit instruction manner includes notifying, by scrambling the PBCH of the serving cell, the UE of a time-frequency resource used by each of one or more neighboring cells. The implicit instruction manner has an advantage that no additional air interface resource needs to be occupied, so that fewer air interface resources can be used.

In a possible embodiment, the instructing, by the base station, the UE to receive the downlink reference signal by using the time-frequency resource configured by the base station includes:
  sending, by the base station, indication signaling to the UE through a physical channel other than a physical broadcast channel of the serving cell, where the indication signaling carries the time-frequency resource information.

In a possible embodiment, the instructing, by the base station, the UE to receive the downlink reference signal by using the time-frequency resource configured by the base station includes:

notifying, by the base station, the UE of the time-frequency resource information through a physical broadcast channel of the serving cell.

In a possible embodiment, the instructing, by the base station, the UE to receive the downlink reference signal by using the time-frequency resource configured by the base station includes:

notifying, by the base station, the UE of partial information of the time-frequency resource information through a physical broadcast channel of the serving cell; and sending, by the base station, indication signaling to the UE through a physical channel other than the physical broadcast channel, where the indication signaling carries information in the time-frequency resource information other than the partial information.

In a possible embodiment, the instructing, by the base station, the UE to receive the downlink reference signal by using the time-frequency resource configured by the base station includes:

encoding, by the base station, the time-frequency resource information to obtain an encoding result;

inputting the encoding result to a shift register to obtain a pseudo-random sequence; and scrambling a physical broadcast channel of the serving cell by using the pseudo-random sequence.

In a possible embodiment, the instructing, by the base station, the UE to receive the downlink reference signal by using the time-frequency resource configured by the base station includes:

encoding, by the base station, the time-frequency resource information to obtain an encoding result;

inputting, by the base station, partial information in the encoding result to a shift register to obtain a pseudo-random sequence; and notifying, by the base station, the UE of information in the encoding result other than the partial information through a physical broadcast channel of the serving cell, and scrambling the physical broadcast channel by using the pseudo-random sequence.

This embodiment of this application further provides another notification manner. Both a network side device illustrated as the base station and the UE prestore a same index table. The index table stores a correspondence between a time-frequency resource information index and time-frequency resource information. When the base station to which the serving cell belongs notifies the neighboring cell or the UE of the configured time-frequency resource, the time-frequency resource index may be used to replace the time-frequency resource information. Because a data amount of the time-frequency resource information index is far less than that of the time-frequency resource information, fewer resources can be used for transmission between base stations, and fewer air interface resources can also be used between the base station and the UE, thereby further improving resource utilization.

In a possible embodiment, the instructing, by the base station, a neighboring cell to send the downlink reference signal to the UE by using a time-frequency resource configured by the base station includes:

sending, by the base station, a notification message to the neighboring cell, where the notification message carries a time-frequency resource information index, the time-frequency resource information index is used to search a prestored index table for time-frequency resource information corresponding to the time-frequency resource information index, and the time-frequency resource information is used to indicate the configured time-frequency resource.

Correspondingly, the instructing, by the base station, the UE to receive the downlink reference signal by using the time-frequency resource configured by the base station includes:

sending, by the base station, indication signaling to the UE, where the indication signaling carries the time-frequency resource information index.

To further improve the utilization of time-frequency resources, after a time period for which the neighboring cell sends the downlink reference signal to the UE by using the time-frequency resource configured by the base station, the configured time-frequency resource may be reclaimed by using a specific mechanism, so that the network side may send service data to the UE by reusing the configured time-frequency resource.

In a specific reclaiming manner, in a possible embodiment, after the instructing, by the base station, the UE to receive the downlink reference signal by using the time-frequency resource configured by the base station, the method further includes:

receiving, by the base station, a measurement result obtained by the UE by performing measurement for the downlink reference signal received on the configured time-frequency resource; and instructing, by the base station based on the measurement result obtained by the UE by performing measurement for the downlink reference signal received on the configured time-frequency resource, the neighboring cell to stop using the configured time-frequency resource to send the downlink reference signal to the UE.

In another specific reclaiming manner, in a possible embodiment, the time-frequency resource information includes time-domain resource information, frequency-domain resource information, and valid time information, where the valid time information is used to indicate a time period in which the time-frequency resource configured by the base station is used for sending the downlink reference signal, and when an end time of the valid time period arrives, the neighboring cell stops using the configured time-frequency resource to send the downlink reference signal to the UE.

According to a second aspect, a reference signal receiving method is further provided, including:

determining, by user equipment UE based on a notification from a base station, a time-frequency resource configured by the base station, where the base station is a base station to which a serving cell of the UE belongs; and receiving a downlink reference signal by using the time-frequency resource configured by the base station.

The UE provided in this embodiment of this application can receive, based on the notification from the base station to which the serving cell belongs, the downlink reference signal by using the time-frequency resource configured by the base station, so that the downlink reference signal can be received in a targeted manner, thereby helping reduce energy consumption of the UE.

In a possible embodiment, the determining, by UE based on a notification from a base station, a time-frequency resource configured by the base station includes:

receiving, by the UE on a physical channel other than a physical broadcast channel of the serving cell, indication signaling sent by the base station, where the indication signaling carries the time-frequency resource information, and the time-frequency resource information is used to indicate the configured time-frequency resource.

In a possible embodiment, the determining, by UE based on a notification from a base station, a time-frequency resource configured by the base station includes:

receiving, by the UE on a physical broadcast channel of the serving cell, time-frequency resource information sent by the base station, where the time-frequency resource information is used to indicate the configured time-frequency resource.

In a possible embodiment, the determining, by UE based on a notification from a base station, a time-frequency resource configured by the base station includes:

receiving, by the UE on a physical broadcast channel of the serving cell, partial information of time-frequency resource information sent by the base station;

receiving, by the UE on a physical channel other than the physical broadcast channel of the serving cell, indication signaling sent by the base station, where the indication signaling carries information in the time-frequency resource information other than the partial information; and combining, by the UE, the partial information of the time-frequency resource information and the information in the time-frequency resource information other than the partial information, and determining a combination processing result as the time-frequency resource information, where the time-frequency resource information is used to indicate the configured time-frequency resource.

In a possible embodiment, the determining, by UE based on a notification from a base station, a time-frequency resource configured by the base station includes:

performing blind detection on a physical broadcast channel of the serving cell, to determine whether the physical broadcast channel is scrambled;

if the physical broadcast channel is scrambled, descrambling the scrambled physical broadcast channel, and determining a descrambling result as a pseudo-random sequence; and decoding the pseudo-random sequence, and determining a decoding result as the time-frequency resource information, where the time-frequency resource information is used to indicate the configured time-frequency resource.

In a possible embodiment, the determining, by UE based on a notification from a base station, a time-frequency resource configured by the base station includes:

performing blind detection on a physical broadcast channel of the serving cell, to determine whether the physical broadcast channel is scrambled;

if the physical broadcast channel is scrambled, descrambling the scrambled physical broadcast channel, and determining a descrambling result as a pseudo-random sequence;

decoding the pseudo-random sequence, and determining a decoding result as partial information of the time-frequency resource information;

obtaining indication signaling sent through the descrambled physical broadcast channel, where the indication signaling carries information in the time-frequency resource information other than the partial information; and combining, by the UE, the partial information of the time-frequency resource information and the information in the time-frequency resource information other than the partial information, and determining a combination processing result as the time-frequency resource information, where the time-frequency resource information is used to indicate the configured time-frequency resource.

In a possible embodiment, the determining, by UE based on a notification from a base station, a time-frequency resource configured by the base station includes:

receiving an indication instruction sent by the base station, where the indication signaling carries the time-frequency resource information index; and searching a stored index table for time-frequency resource information corresponding to the time-frequency resource information index, where the time-frequency resource information is used to indicate the configured time-frequency resource.

In a possible embodiment, the method further includes:

measuring, by the UE, the downlink reference signal received on the configured time-frequency resource, and reporting a measurement result to the base station, so that the base station to which the serving cell belongs determines, based on the measurement result, reported by the UE, of the downlink reference signal received on the configured time-frequency resource, whether to reclaim the previously configured time-frequency resource. This further improves resource utilization.

According to a third aspect, a base station is provided. The base station is a base station to which a serving cell of UE belongs. This apparatus has a function of implementing the method in the first aspect or any possible embodiment of the first aspect. The function may be implemented by hardware, or may be implemented by hardware by executing corresponding software. The hardware or the software includes one or more modules corresponding to the function.

According to a fourth aspect, UE is provided. The UE has a function of implementing the method in the second aspect or any possible embodiment of the second aspect. The function may be implemented by hardware, or may be implemented by hardware by executing corresponding software. The hardware or the software includes one or more modules corresponding to the function.

According to a fifth aspect, an embodiment of this application provides a computer storage medium, configured to store a computer software instruction used by the packet forwarding device, where the computer software instruction includes a program designed for executing the method in the first aspect or any possible embodiment of the first aspect.

According to a sixth aspect, an embodiment of this application provides a computer storage medium, configured to store a computer software instruction used by the packet forwarding device, where the computer software instruction includes a program designed for executing the method in the second aspect or any possible embodiment of the second aspect.

According to a seventh aspect, an embodiment of this application provides a reference signal sending system. The system includes the base station described in the third aspect and the UE described in the fourth aspect.

BRIEF DESCRIPTION OF DRAWINGS

To describe the technical solutions in the embodiments of this application more clearly, the following briefly describes the accompanying drawings used for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

In view of a problem of relatively high consumption of air interface resources in an existing CRS sending manner, the embodiments of this application provide a reference signal sending solution. In this solution, instead of using a fixed time-frequency resource to continuously send downlink reference signals, a network side device sends, as required within a partial time period, a downlink reference signal by using a configured time-frequency resource. For example, the network side device illustrated as a base station confirms, according to an actual case, that a time-frequency resource used for sending the downlink reference signal can be configured for a cell only when the downlink reference signal needs to be sent, and instructs at least one cell to send the downlink reference signal based on configuration information in a relatively short time. When no downlink reference signal needs to be sent, the time-frequency resource used for sending the downlink reference signal may be used to send other data, so that fewer time-frequency resources are occupied for sending the downlink reference signal, thereby improving utilization of air interface resources.

Figure 1:
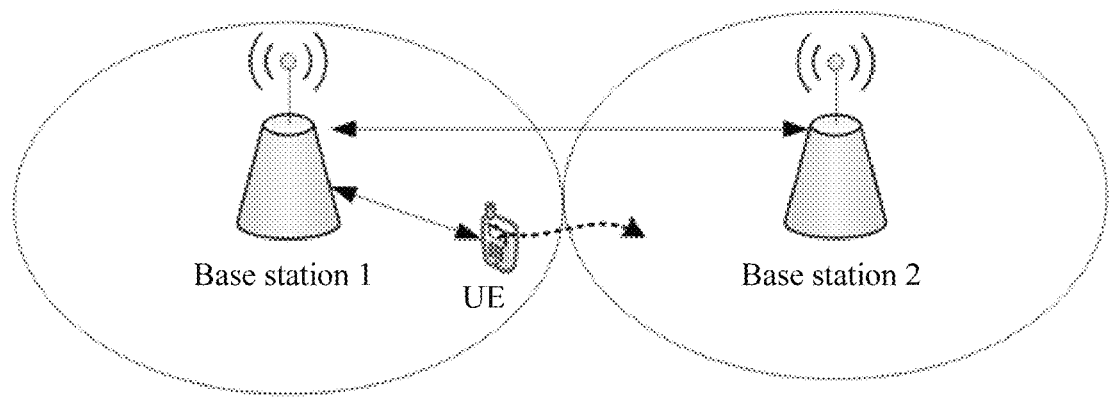
FIG. 1 is a schematic diagram of a scenario in which a reference signal sending method is applied according to an embodiment of this application.

FIG. 1 is a schematic diagram of an application scenario according to an embodiment of this application. For brevity, only a base station 1, a base station 2, and UE are used as an example for description. The base station 1 is a base station to which a current serving cell of the UE belongs, and the base station 2 is a base station to which a neighboring cell of the UE belongs. Although the current serving cell and the neighboring cell of the UE may belong to one base station, this embodiment of this application mainly focuses on a scenario in which the current serving cell and the neighboring cell of the UE belong to different base stations. The base station 1 and the base station 2 exchange signaling through, for example, an X2 interface. In this embodiment of this application, the serving cell is a cell that provides uplink/downlink data transmission for the UE.

Optionally, the UE in FIG. 1 is in an RRC_CONNECTED state, a radio resource control idle (e.g., Radio Resource Control_IDLE, RRC_IDLE, or the like) state, or a radio resource control inactive (e.g., Radio Resource Control_Inactive, RRC_Inactive, of the like) state. For the RRC_CONNECTED state and the RRC_IDLE state, refer to descriptions in the LTE standard. The RRC_Inactive state is a state that is still being discussed in a new radio (NR) standard. The UE in the RRC_Inactive state has the following characteristic: A network side retains context information of the UE in the RRC_INACTIVE state. The base station and a core network retain connection information of the UE in the RRC_INACTIVE state. The network side may learn of a location of the UE in the RRC_INACTIVE state at an radio access network notification area (RNA) layer, that is, a network layer may learn of a specific RNA in which the UE is located. When the UE in the RRC_INACTIVE state moves out of the RNA in which the UE is located, the network side can be aware that such case occurs. The base station 1 may send information to the UE through a broadcast channel, dedicated signaling, or another manner.

Figure 2:
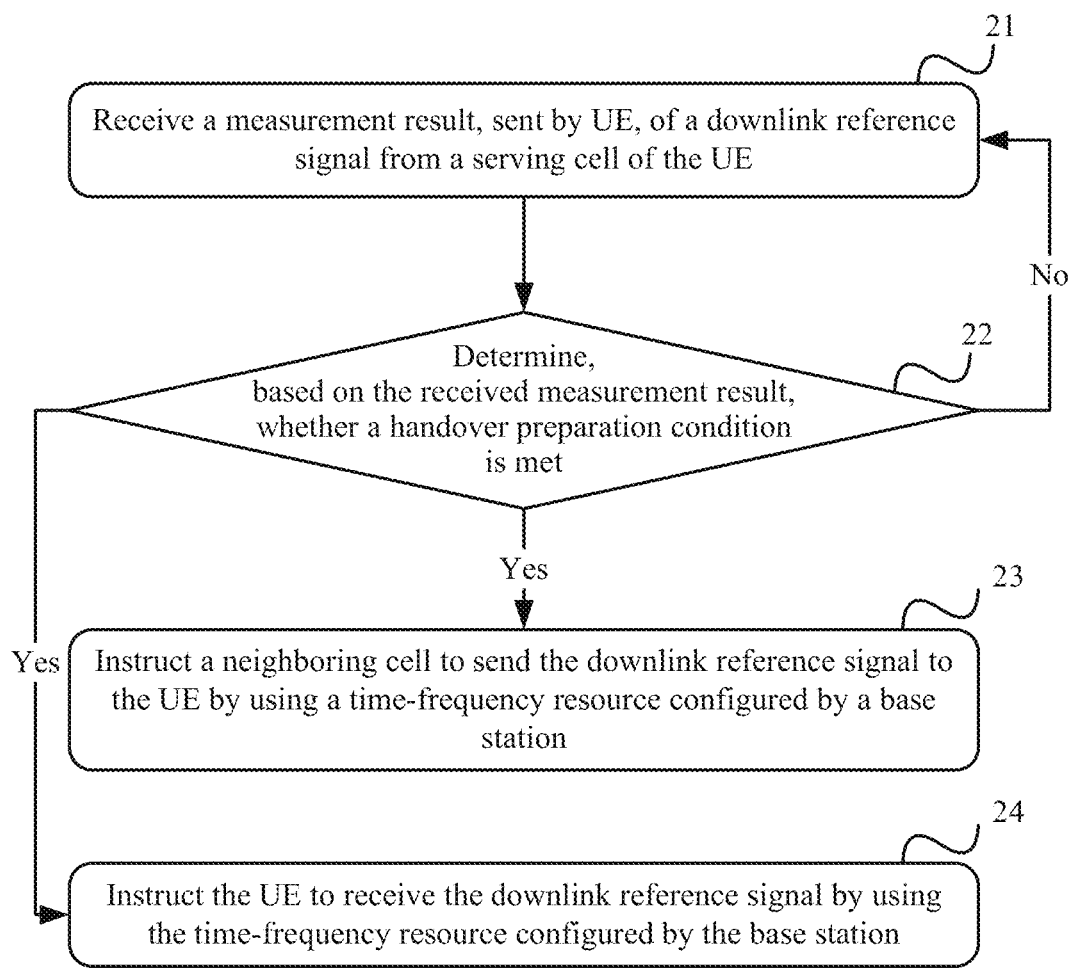
FIG. 2 is a flowchart of a reference signal sending method according to an embodiment of this application.

FIG. 2 is a flowchart of a reference signal sending method according to an embodiment of this application. The following mainly describes the reference signal sending method from a perspective of a base station to which a current serving cell of UE belongs, that is, from a perspective of the base station 1 in FIG. 1. A base station in the following embodiments is the base station to which the current serving cell of the UE belongs, unless otherwise specified.

Step 21: The base station receives a measurement result, sent by the UE, of a downlink reference signal from the serving cell of the UE, where the base station is a base station to which the serving cell of the UE belongs.

The downlink reference signal is predefined, and occupies some specific resource elements (RE) on a time-frequency resource grid. The RE is a smallest time-frequency resource unit in an LTE network. Time-frequency resource grids corresponding to all antenna ports of the base station are different from each other, and each antenna port is corresponding to one reference signal. The time-frequency resource grid is used to describe a time-domain location and a frequency-domain location of one or more REs in a form of a two-dimensional grid. Different ports are corresponding to different time-frequency resources. The time-frequency resource may be indicated by using time-frequency resource information. The time-frequency resource information includes time-domain resource information and frequency-domain resource information that are used for indicating an RE. The frequency-domain resource information is used to indicate a frequency-domain subcarrier to which the RE used for sending the downlink reference signal belongs. The time-domain resource information is used to indicate information about a time-domain symbol to which the RE used for sending the downlink reference signal belongs. The time-domain resource information and the frequency-domain resource information may be used to determine a time-domain location and a frequency-domain location of the RE used for sending the downlink reference signal.

Optionally, the time-frequency resource information further includes beam indication information, and the beam indication information is used to indicate a beam used by the UE when the UE receives the reference signal, so that the UE receives the downlink reference signal on a beam in a specific direction, and a neighboring cell sends the downlink reference signal on the corresponding beam. The UE receives the reference signal by using a beamforming technology, to achieve a gain effect in the specified direction.

Over a downlink, a set of antenna ports supported by a cell depends on a reference signal configuration of the cell.

Optionally, the downlink reference signal includes the following types: a cell-specific reference signal (CRS), a UE-specific reference signal, a positioning reference signal, and a channel state information-reference signal (CSI-RS). The CSI-RS is used to support channel quality feedback performed through a plurality of antenna ports. A CSI-RS reference signal sequence includes a series of reference symbols, and each reference symbol occupies one RE.

Optionally, in this embodiment of this application, the downlink reference signal from the serving cell is a CSI-RS. For all UEs within a coverage range of a cell, the cell sends same CSI-RS sequences but sends the CSI-RS sequences to all the UEs on different time-frequency resources. For example, a CSI-RS sequence $r_{l,n_s}(m)$ may be obtained through calculation according to formula (1).

$$r_{l,n_s}(m) = \frac{1}{\sqrt{2}}(1 - 2 \cdot c(2m)) + j\frac{1}{\sqrt{2}}(1 - 2 \cdot c(2m+1)), \quad (1)$$

$$m = 0, 1, \ldots, N_{RB}^{max,DL} - 1$$

where c in formula (1) may be obtained according to formula (2):

$$c_{init} = 2^{10} \cdot (7 \cdot (n_s + 1) + l + 1) \cdot (2 \cdot N_{ID}^{CSI} + 1) + 2 \cdot N_{ID}^{CSI} + N_{CP}, \text{ where}$$

$$N_{CP} = \begin{cases} 1 & \text{for normal } CP \\ 0 & \text{for extended } CP \end{cases};$$

$C_{init}$ means to initialize a pseudo-random sequence; $n_s$ represents a slot number in a system frame, ranging from 0 to 19; l represents a symbol number in a slot; and $N_{ID}^{CSI}$ represents a cell identity, for example, a physical cell identifier (English: Physical Cell Identifier, PCI).

The serving cell notifies, through system information (SI) such as a master information block (MIB) or a system information block (SIB), the UE of time-frequency resource information used for sending the downlink reference signal by the serving cell. The UE measures an RSRP of the serving cell. To be specific, the UE receives, on a specified time-frequency resource, an average of powers for downlink reference signals from the serving cell, and reports a measurement result to the base station to which the serving cell belongs.

Step 22: The base station determines, based on the measurement result received in step 21, whether a handover preparation condition is met. Optionally, the handover preparation condition may be configured according to an actual case. For example, the handover preparation condition may be that signal quality of the serving cell is less than a specified threshold, and duration for which the signal quality is less than the specified threshold exceeds a predetermined time. The base station determines, based on the measurement result reported by the UE, whether the handover preparation condition is met. Determining that the handover preparation condition is met may be considered as a trigger event of an action of configuring, by the base station for the neighboring cell, a time-frequency resource used for sending the downlink reference signal.

If the handover preparation condition is met, the base station performs step 23 and step 24. If the handover preparation condition is not met, the process returns to step 21, that is, the base station continues to receive a measurement result, reported by the UE, of the downlink reference signal from the serving cell.

Step 23: The base station instructs the neighboring cell to send the downlink reference signal to the UE by using the time-frequency resource configured by the base station.

The base station stores all time-frequency resource information currently available for sending the downlink reference signal on a network side. When the handover preparation condition is met, the base station separately configures, for one or more neighboring cells, a time-frequency resource used for sending the downlink reference signal to the UE. The base station may notify, through an X2 interface, the configured time-frequency resource to a base station to which the neighboring cell belongs. Two neighboring cells are used as an example. Through X2 interfaces between base stations, the base station to which the serving cell belongs notifies a base station to which a neighboring cell 1 belongs of a time-frequency resource allocated to the neighboring cell 1, and notifies a base station to which a neighboring cell 2 belongs of a time-frequency resource allocated to the neighboring cell 2. Before obtaining the notification from the base station, the neighboring cell does not need to send the downlink reference signal to the UE.

In this embodiment of this application, the neighboring cell is determined for the UE by the base station to which the serving cell belongs. Optionally, a relative location relationship between cells is determined during network planning, for example, during designing a network topology by a network planner. Certainly, in a network running process, the network topology may be updated as required. The serving cell may determine the neighboring cell according to the network topology, and the neighboring cell may be another cell physically adjacent to the serving cell.

After receiving, through the X2 interface, the notification from the base station to which the serving cell belongs, the base station to which the neighboring cell belongs configures an antenna port based on the notification, so that the neighboring cell sends the downlink reference signal to the UE on the configured time-frequency resource. Optionally, the downlink reference signal is a CSI-RS.

Step 24: The base station instructs the UE to receive the downlink reference signal by using the time-frequency resource configured by the base station.

Optionally, the base station explicitly or implicitly instructs the neighboring cell to send the downlink reference signal to the UE by using the time-frequency resource configured by the base station.

Optionally, in this embodiment, the explicit instruction manner includes notifying, through a channel such as a physical broadcast channel (PBCH) of the serving cell or dedicated RRC signaling, the UE of a time-frequency resource used by each of one or more neighboring cells. The explicit instruction manner has an advantage that through simple processing, the time-frequency resource that is notified by the network side can be rapidly learned of by the UE, so that a relatively small quantity of processing resources of the base station and the UE are consumed. However, an air interface resource needs to be occupied, and overheads of the air interface resource are relatively large.

The implicit instruction manner includes notifying, by scrambling the PBCH of the serving cell, the UE of a time-frequency resource used by each of one or more neighboring cells. The UE may learn of, through processing such as blind detection and decoding, a time-frequency resource used by each of one or more neighboring cells. The implicit instruction manner has an advantage that no additional air interface resource needs to be occupied, so that fewer air interface resources can be used. However, in the implicit instruction manner, processes of processing transmitted data by the network side and the UE are relatively complex, and consequently the base station and the UE consume a relatively large quantity of processing resources.

The UE determines, based on the notification from the base station to which the serving cell belongs, the time-frequency resource configured by the base station; and receives the downlink reference signal by using the time-frequency resource configured by the base station. Optionally, the UE performs measurement for the received downlink reference signal, and reports a measurement result to the base station.

According to the reference signal sending method provided in this embodiment of this application, the base station to which the serving cell belongs receives the measurement result, sent by the UE, of the downlink reference signal from the serving cell of the UE. When the base station determines, based on the measurement result, that the predetermined handover preparation condition is met, the base station instructs the neighboring cell to send the downlink reference signal to the UE by using the time-frequency resource configured by the base station, and instructs the UE to receive the downlink reference signal by using the time-frequency resource configured by the base station. Before obtaining the instruction of the base station to which the serving cell belongs, the neighboring cell does not need to send the downlink reference signal to the UE. Before receiving the instruction, the neighboring cell may transmit other data by using the configured resource. According to the method, the network side may configure each cell to send a downlink reference signal to the UE by using a specified resource at intervals, so that the cell does not need to continuously occupy the fixed time-frequency resource to send the downlink reference signal, so that fewer time-frequency resources are occupied for sending the downlink reference signal to the UE by the network side, thereby improving utilization of air interface resources.

Optionally, after a time period for which the neighboring cell sends the downlink reference signal to the UE by using the time-frequency resource configured by the base station, the configured time-frequency resource may be reclaimed by using a specific mechanism, so that the network side may send service data to the UE by reusing the configured time-frequency resource, thereby improving resource utilization. The network side may reclaim the configured time-frequency resource in the following several manners.

Manner 1: The base station instructs, based on the measurement result, reported and obtained by the UE by performing measurement for the downlink reference signal received on the configured time-frequency resource, the neighboring cell to stop using the configured time-frequency resource to send the downlink reference signal to the UE.

Figure 3:
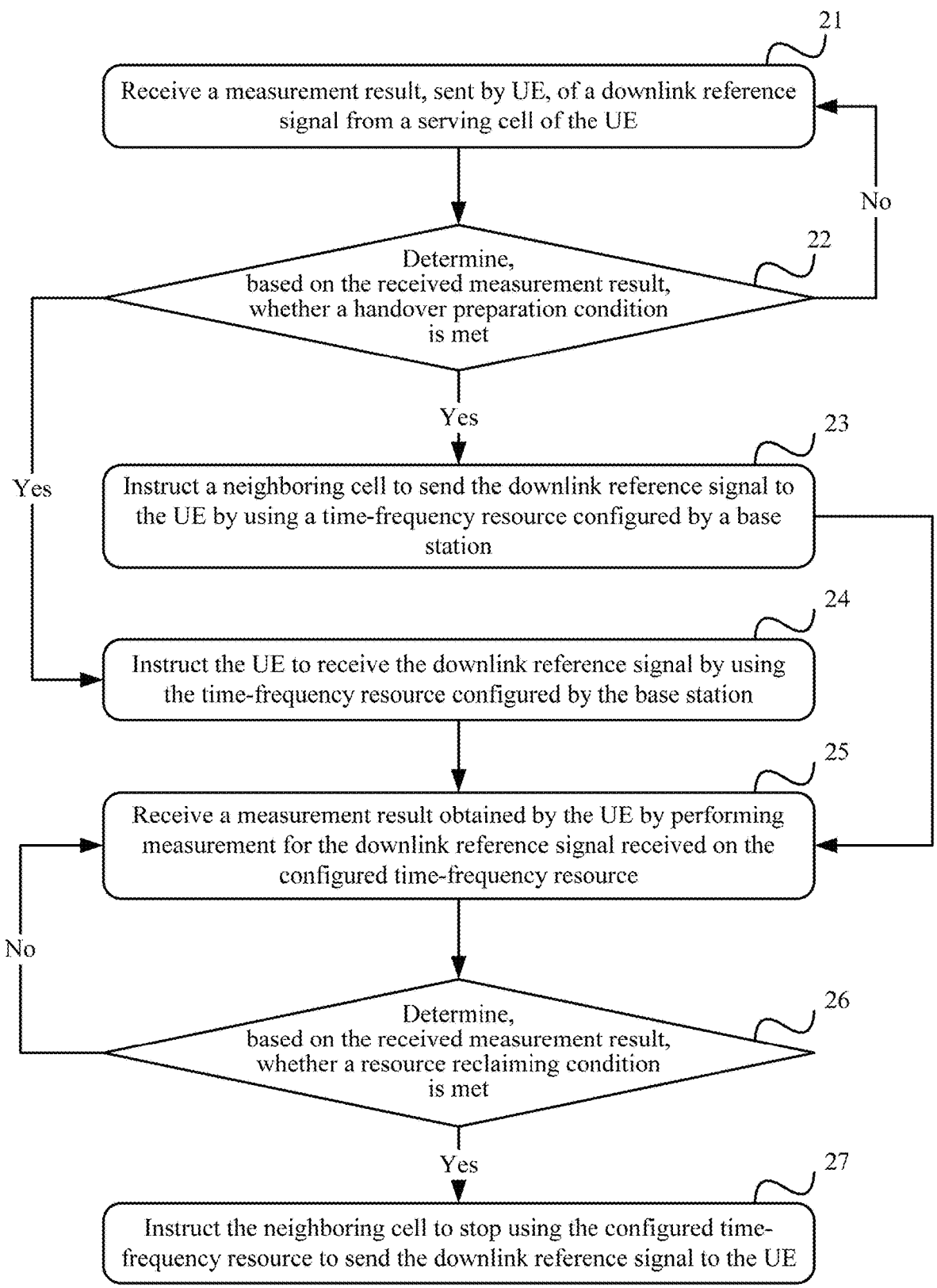
FIG. 3 is a flowchart of another reference signal sending method according to an embodiment of this application.

Referring to FIG. 3, after step 23 and step 24 in FIG. 2, the method further includes the following steps.

Step 25: The base station receives a measurement result obtained by the UE by performing measurement for the downlink reference signal received on the configured time-frequency resource.

Step 26: The base station determines, based on the measurement result received in step 25, whether a resource reclaiming condition is met. The resource reclaiming condition may be configured according to an actual case. The resource reclaiming condition includes but is not limited to the following several conditions:

Resource reclaiming condition 1: determining, based on the measurement result received in step 24, that inter-cell handover needs to be performed.

Resource reclaiming condition 2: determining, based on the measurement result received in step 24, that the UE stays at a fixed location. For example, during a time period, a change amplitude of a measurement result of each cell is less than a specified threshold, it may be considered that the UE stays at a fixed location.

Resource reclaiming condition 3: determining, based on the measurement result received in step 24, that signal quality of the neighboring cell is relatively poor, and that inter-inter-cell handover does not need to be performed. For example, the signal quality of the neighboring cell is lower than a specified threshold of the serving cell, and duration for which the signal quality of the neighboring cell is lower than the specified threshold of the serving cell exceeds specified duration, it may be considered that the signal quality of the neighboring cell is relatively poor.

If the resource reclaiming condition is met, the base station performs step 27. If the resource reclaiming condition is not met, the process returns to step 25, that is, the base station continues to wait for receiving a measurement report.

Step 27: The base station instructs the neighboring cell to stop using the configured time-frequency resource to send the downlink reference signal to the UE. For example, the base station may notify, through an X2 interface between base stations, the neighboring cell of a measurement termination instruction. After receiving the measurement termination instruction, the neighboring cell stops using the previously configured time-frequency resource to send the downlink reference signal to the UE.

Manner 2: In step 23 in FIG. 2, when the base station instructs the neighboring cell to send, to the UE, the downlink reference signal by using the time-frequency resource configured by the base station, the base station adds a measurement termination time to the time-frequency resource information, and notifies the neighboring cell of the measurement termination time.

Specifically, the time-frequency resource information not only includes time-domain resource information and frequency-domain resource information, but also includes valid time information. The valid time information is used to indicate a time period in which the time-frequency resource configured by the base station is used for sending the downlink reference signal, and when an end time of the valid time period arrives, the neighboring cell stops using the configured time-frequency resource to send the downlink reference signal to the UE. For example, the valid time information is 70 ms. After receiving the time-frequency resource information, the neighboring cell starts using the configured time-frequency resource to send the downlink reference signal to the UE. In addition, a timer is set upon sending the downlink reference signal, and duration of the timer is set to 70 ms. When the duration set for the timer expires, the neighboring cell stops using the configured time-frequency resource to send the downlink reference signal to the UE.

Manner 3: Based on a presetting, after a preset time is reached after the neighboring cell starts using the configured time-frequency resource to send the downlink reference signal to the UE, each neighboring cell stops using the configured time-frequency resource to send the downlink reference signal to the UE by default. Specifically, the network side preconfigures duration in which each base station sends the downlink reference signal. For example, after receiving the notification from the base station to which the serving cell belongs and that is described in step 23 in FIG. 2, all base stations start using the configured time-frequency resource to send the downlink reference signal to the UE by default. In addition, a timer is set upon sending the downlink reference signal, for example, duration of the timer may be set to 50 ms. When the duration set for the timer expires, the neighboring cell stops using the configured time-frequency resource to send the downlink reference signal to the UE.

For step 23 in FIG. 2 and FIG. 3, the base station instructs the neighboring cell to send the downlink reference signal to the UE by using the time-frequency resource configured by the base station. This embodiment of this application also provides a plurality of specific notification manners. Correspondingly, for step 24 in FIG. 2 and FIG. 3, the base station instructs the UE to receive the downlink reference signal by using the time-frequency resource configured by the base station. This embodiment of this application also provides a plurality of specific notification manners. The following focuses on describing in detail specific notification manners with reference to FIG. 4 to FIG. 9. In reference signal sending methods respectively shown in FIG. 4, FIG. 5, and FIG. 6, the base station to which the serving cell belongs explicitly notifies the UE of time-frequency resource information. In reference signal sending methods respectively shown in FIG. 7 and FIG. 8, the base station to which the serving cell belongs implicitly notifies the UE of time-frequency resource information.

Figure 4:
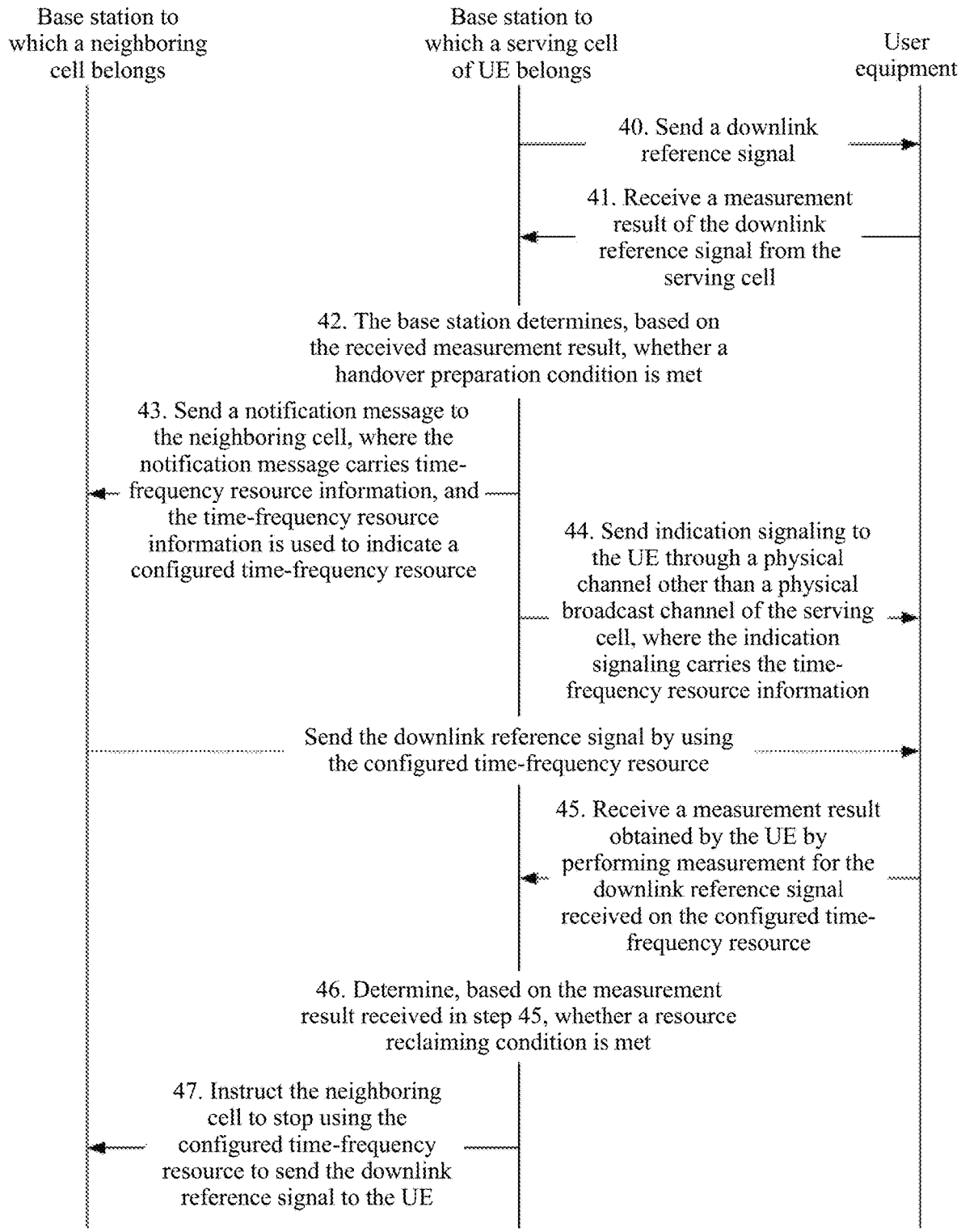
FIG. 4 is a flowchart of a reference signal sending method according to another embodiment of this application.

FIG. 4 is a flowchart of a reference signal sending method according to an embodiment of this application.

Step 40: A base station sends a downlink reference signal to UE through a serving cell. In this embodiment, the base station is a base station to which the serving cell of the UE belongs. Optionally, the downlink reference signal is a CSI-RS.

Step 41: The base station receives a measurement result, sent by the UE, of the downlink reference signal from the serving cell of the UE. In this embodiment, the base station is the base station to which the serving cell of the UE belongs, unless otherwise specified.

Implementations of step 40 and step 41 are basically similar to an implementation of step 21 in FIG. 2, and reference may be made to the description of step 21 in FIG. 2 in the foregoing embodiment. No more details are described herein.

Step 42: The base station determines, based on the measurement result received in step 41, whether a handover preparation condition is met. An implementation of step 42 is basically similar to an implementation of step 22 in FIG. 2, and reference may be made to the description of step 22 in FIG. 2 in the foregoing embodiment. No more details are described herein. If the handover preparation condition is met, the base station performs step 43 and step 44. If the handover preparation condition is not met, the process returns to step 40. To be specific, the base station continues to send the downlink reference signal to the UE through the serving cell, and receives a measurement result obtained by the UE by performing measurement for the reference signal that is sent by the serving cell.

Step 43: The base station sends a notification message to a neighboring cell, where the notification message carries time-frequency resource information, and the time-frequency resource information is used to indicate a configured time-frequency resource.

Refer to the description of step 23 in FIG. 2. The base station configures, for the neighboring cell, the time-frequency resource used for sending the downlink reference signal to the UE. Then, the base station adds, to the notification message, the time-frequency resource information used for indicating the configured time-frequency resource, and sends, through an X2 interface between base stations, the notification message to the base station to which the neighboring cell belongs. The notification message is used to instruct the neighboring cell to send the downlink reference signal to the UE by using the time-frequency resource indicated by the time-frequency resource information.

Optionally, the notification message not only carries the time-frequency resource information, but also carries an identifier of the neighboring cell, so that after receiving the notification message, the base station to which the neighboring cell belongs establishes a correspondence between the neighboring cell and the time-frequency resource information, and then configures a port of the neighboring cell, to send the downlink reference signal to the UE by using the time-frequency resource indicated by the time-frequency resource information. For example, the base station to which the serving cell belongs generates a notification message, where the notification message carries time-frequency resource information corresponding to a time-frequency resource that is allocated to a neighboring cell 1 and an identifier of the neighboring cell 1. Then, the base station to which the serving cell belongs sends, through an X2 interface, the generated notification message to a base station to which the neighboring cell 1 belongs. Before obtaining the notification message, the neighboring cell does not need to send the downlink reference signal to the UE.

Step 44: The base station sends indication signaling to the UE through a physical channel other than a PBCH of the serving cell, where the indication signaling carries the time-frequency resource information. For a description of the time-frequency resource information, refer to the description in the foregoing embodiment. No more details are described herein.

Optionally, in this embodiment, the indication signaling is an RRC message. Specifically, in an LTE network, indication signaling in an RRC message form may be sent to the UE by using a SIB. For a time-frequency resource occupied by the SIB, refer to related standard documents. In an NR network being discussed, the indication signaling in the RRC message form may be alternatively sent to the UE by using remaining minimum system information (RMSI), where the RMSI may be transmitted through a PBCH or a physical downlink control channel (PDCCH). The indication signaling in the RRC message form may be alternatively sent to the UE by using other system information (OSI), where the OSI may be transmitted through a physical downlink shared channel PDSCH).

The indication signaling is used to instruct the UE to receive the downlink reference signal by using the time-frequency resource indicated by the time-frequency resource information.

The UE receives, through the physical channel other than the PBCH of the serving cell, the indication signaling sent by the base station. The UE receives the downlink reference signal by using the time-frequency resource indicated by the time-frequency resource information, performs measurement for the received downlink reference signal, and reports a measurement result to the base station.

Optionally, the indication signaling in the RRC message form not only carries the time-frequency resource information, but also carries the identifier of the neighboring cell, so that the UE performs measurement for the reference signal received on the time-frequency resource indicated by the time-frequency resource information, and reports a measurement result and the identifier of the neighboring cell to a network side after receiving the measurement result. Certainly, alternatively, the RRC message may not carry the identifier of the neighboring cell, and the UE may report the measurement result and the time-frequency resource information to the network side. Because the base station to which the serving cell belongs stores a correspondence between the identifier of the neighboring cell and the time-frequency resource information used for indicating the configured time-frequency resource, the base station may still confirm the correspondence between the measurement result and the identifier of the neighboring cell.

Optionally, to improve utilization of time-frequency resources, after an action of sending, by the neighboring cell by using the configured time-frequency resource, downlink reference information to the UE lasts for a time period, the network side may reclaim the configured time-frequency resource to transmit other data. The time-frequency resource may be reclaimed in a plurality of manners, as described in the foregoing embodiment. In this embodiment, only manner 1 is used for description. After step 43 and step 44, step 45 is performed.

Step 45: The base station receives a measurement result obtained by the UE by performing measurement for the downlink reference signal received on the configured time-frequency resource. In addition to reporting the measurement result, the UE further needs to report the identifier of the neighboring cell or the time-frequency resource information used for indicating the time-frequency resource occupied by the downlink reference signal based on which the measurement result is generated. In this way, the base station may confirm a correspondence between the measurement result and the neighboring cell.

Step 46: The base station determines, based on the measurement result received in step 45, whether a resource reclaiming condition is met. If the resource reclaiming condition is met, the base station performs step 47. If the resource reclaiming condition is not met, the process returns to step 45, that is, the base station continues to wait for receiving a measurement report. For related content of the resource reclaiming condition, refer to the description in the foregoing embodiment. No more details are described herein.

Step 47: The base station instructs the neighboring cell to stop using the configured time-frequency resource to send the downlink reference signal to the UE.

Step 46 and step 47 are respectively similar to step 26 and step 27 in the embodiment shown in FIG. 3, and reference may be made to the descriptions of step 26 and step 27 in FIG. 3 in the foregoing embodiment. No more details are described herein.

Figure 5:
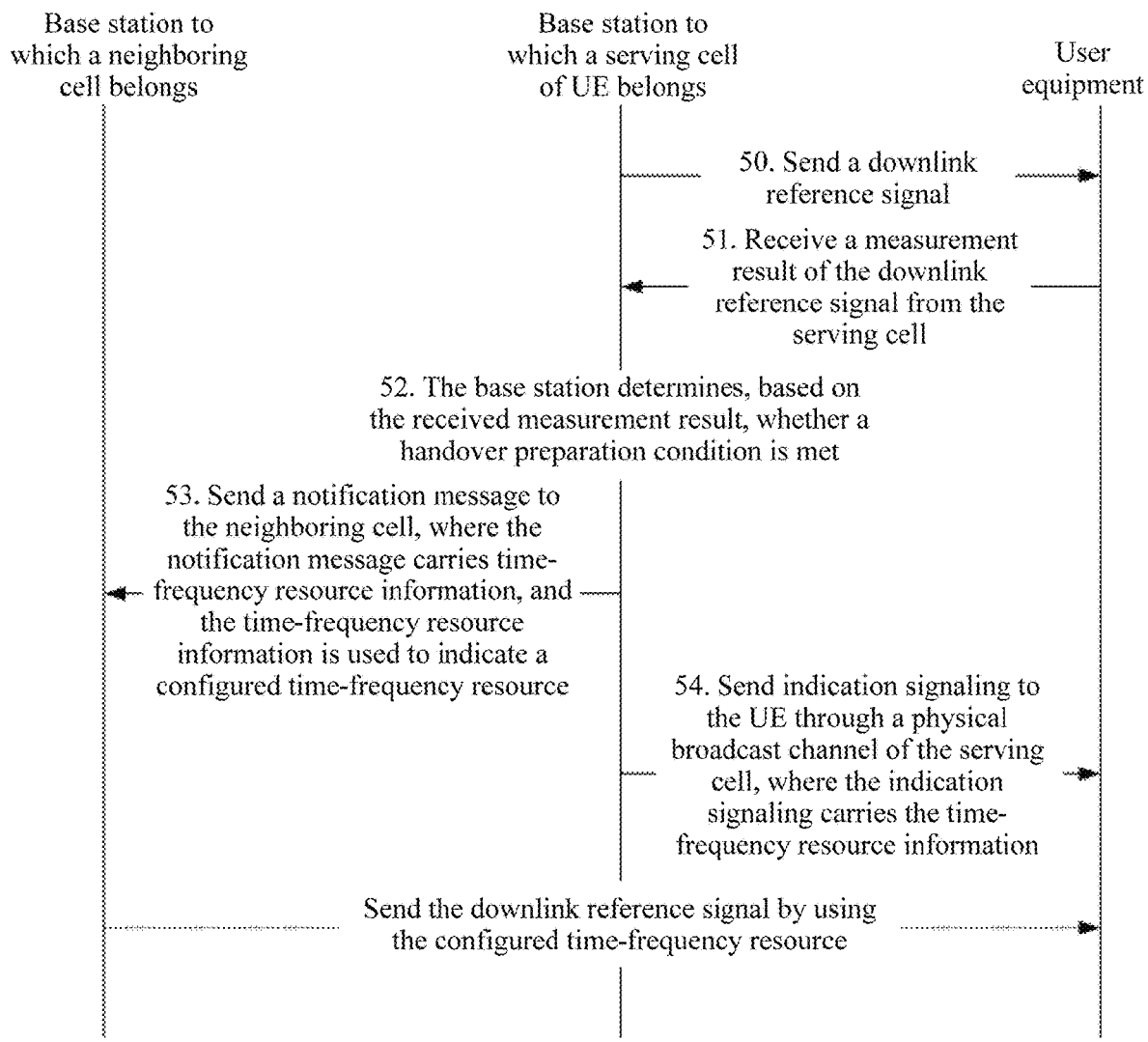
FIG. 5 is a flowchart of a reference signal sending method according to another embodiment of this application.

FIG. 5 is a flowchart of a reference signal sending method according to an embodiment of this application. A base station notifies, through a PBCH, UE of information about a configured time-frequency resource. In other words, step 44 in FIG. 4 may be replaced with step 54. Step 50, step 51, step 52, and step 53 in FIG. 5 are respectively similar to step 40, step 41, step 42, and step 43 in FIG. 4, and reference may be made to the foregoing descriptions of these steps in FIG. 4. No more details are described herein.

Step 54: The base station notifies the UE of the time-frequency resource information through a PBCH of the serving cell. For a description of the time-frequency resource information, refer to the description in the foregoing embodiment. No more details are described herein.

Optionally, in this embodiment, indication signaling is an RRC message. Specifically, in an LTE network, the indication signaling in an RRC message form may be sent to the UE by using a MIB. The MIB may be transmitted through the PBCH.

The indication signaling is used to instruct the UE to receive the downlink reference signal by using the time-frequency resource indicated by the time-frequency resource information.

The UE receives, through the PBCH of the serving cell, the time-frequency resource information sent by the base station. The UE receives the downlink reference signal by using the time-frequency resource indicated by the time-frequency resource information, performs measurement for the received downlink reference signal, and reports a measurement result to the base station.

Optionally, the indication signaling in the RRC message form not only carries the time-frequency resource information, but also carries an identifier of the neighboring cell, so that the UE performs measurement for the reference signal received on the time-frequency resource indicated by the time-frequency resource information, and reports a measurement result and the identifier of the neighboring cell to a network side after receiving the measurement result. Certainly, alternatively, the RRC message may not carry the identifier of the neighboring cell, and the UE may report the measurement result and the time-frequency resource information to the network side. Because the base station to which the serving cell belongs stores a correspondence between the identifier of the neighboring cell and the time-frequency resource information used for indicating the configured time-frequency resource, the base station may still confirm the correspondence between the measurement result and the identifier of the neighboring cell.

Figure 6:
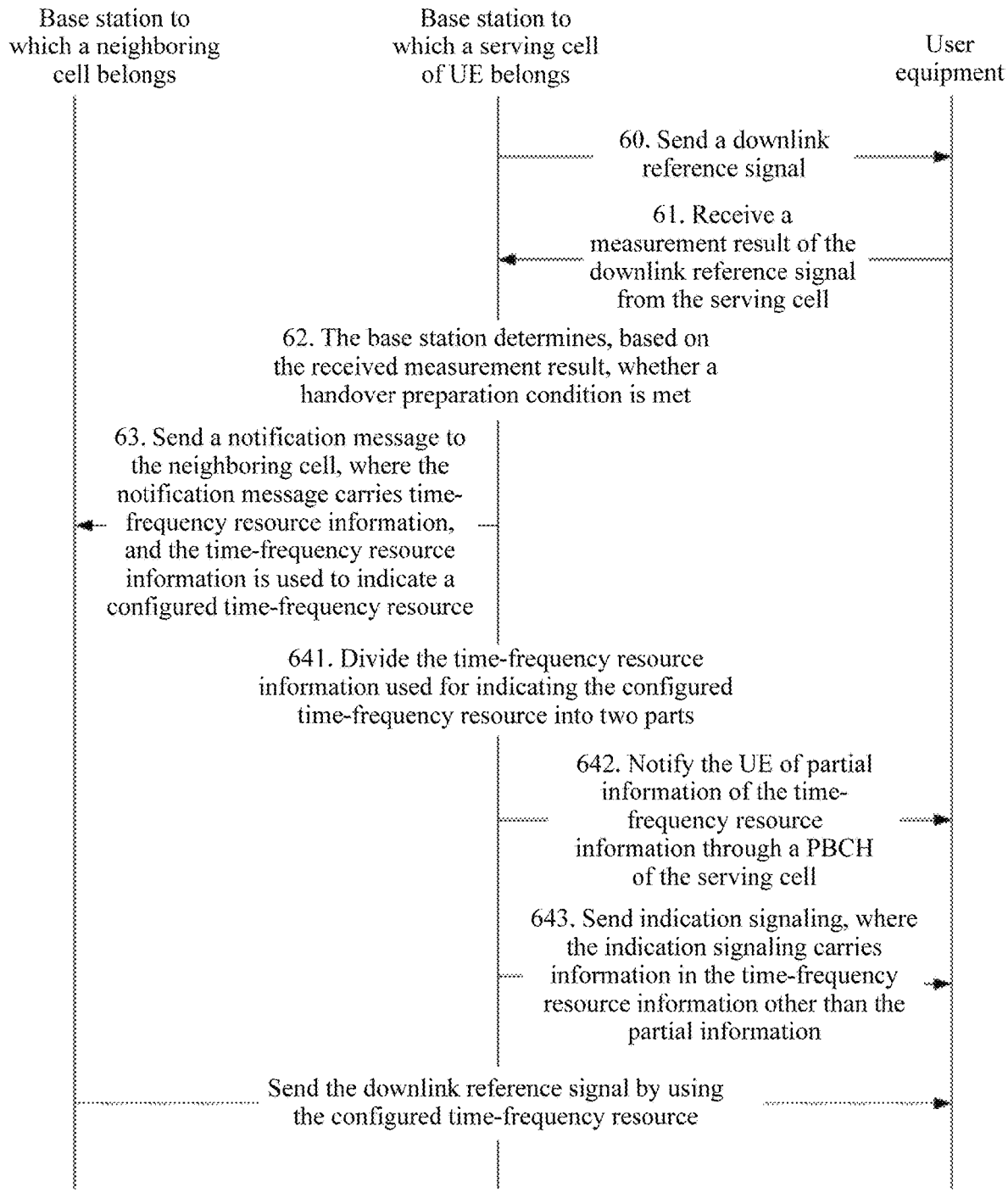
FIG. 6 is a flowchart of a reference signal sending method according to another embodiment of this application.

FIG. 6 is a flowchart of a reference signal sending method according to an embodiment of this application. A base station divides time-frequency resource information into at least two parts, notifies UE of partial time-frequency resource information through a PBCH, and notifies the UE of remaining time-frequency resource information through another physical channel. In other words, step 44 in FIG. 4 may be alternatively replaced with step 641, step 642, and step 643. Step 60, step 61, step 62, and step 63 in FIG. 5 are respectively similar to step 40, step 41, step 42, and step 43 in FIG. 4, and reference may be made to the foregoing descriptions of these steps in FIG. 4 in the foregoing embodiment. No more details are described herein.

Step 641: The base station divides time-frequency resource information used for indicating a configured time-frequency resource into two parts, for example, a first part of information and a second part of information.

Step 642: The base station notifies the UE of partial information of the time-frequency resource information through a PBCH of the serving cell.

Step 643: The base station sends indication signaling to the UE, where the indication signaling carries information in the time-frequency resource information other than the partial information.

For example, the base station adds the partial information (for example, the first part of information) of the time-frequency resource information to first indication signaling in an RRC message form, and sends the first indication signaling to the UE by using a MIB. The MIB may be transmitted through the PBCH. The base station sends second indication signaling to the UE, where the second indication signaling carries the information (for example, the second part of information) in the time-frequency resource information other than the partial information. Refer to the related description of step 44 in FIG. 4. The second indication signaling may be sent to the UE by using a SIB, RMSI, or OSI, and the second indication signaling carrying the second part of information is transmitted through a PDCCH. No more details are described herein.

The UE receives, through the PBCH of the serving cell, the partial information of the time-frequency resource information sent by the base station. The UE receives, through a physical channel other than the PBCH of the serving cell, indication signaling sent by the base station, where the indication signaling carries the information in the time-frequency resource information other than the partial information. The UE combines the partial information of the time-frequency resource information and the information in the time-frequency resource information other than the partial information, and determines a combination processing result as the time-frequency resource information. The UE receives the downlink reference signal by using the time-frequency resource indicated by the time-frequency resource information, performs measurement for the received downlink reference signal, and reports a measurement result to the base station.

In the reference signal sending methods respectively shown in FIG. 4, FIG. 5, and FIG. 6, the base station to which the serving cell belongs explicitly notifies the UE of the time-frequency resource information. The following separately describes, with reference to FIG. 7 and FIG. 8, several solutions in which a base station to which a serving cell belongs implicitly notifies UE of time-frequency resource information.

Figure 7:
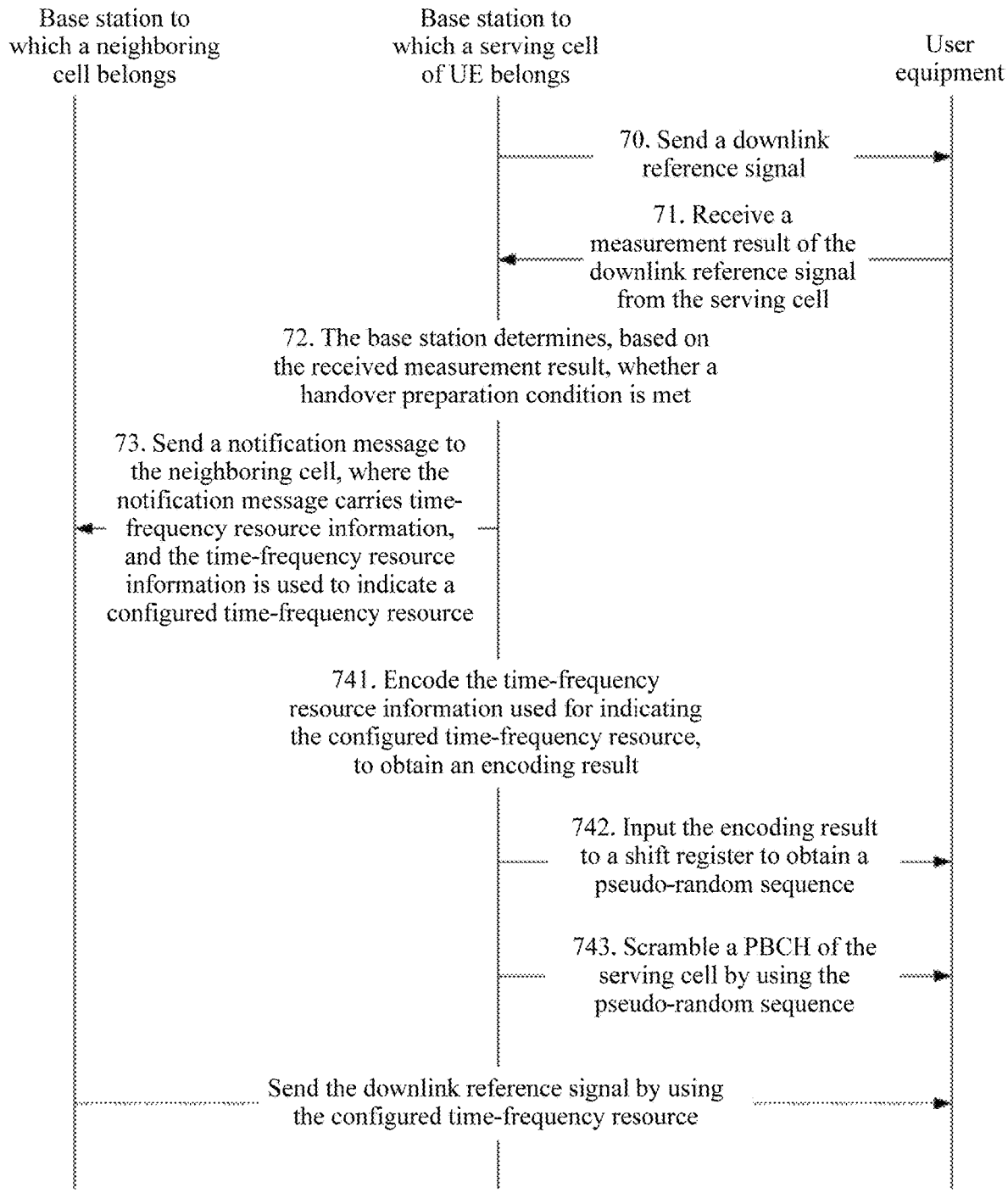
FIG. 7 is a flowchart of a reference signal sending method according to another embodiment of this application.

FIG. 7 is a flowchart of another reference signal sending method according to an embodiment of this application. A base station scrambles a PBCH based on time-frequency resource information, to notify UE of the time-frequency resource information. In other words, step 44 in FIG. 4 may be alternatively replaced with step 741, step 742, and step 743. Step 70, step 71, step 72, and step 73 in FIG. 7 are respectively similar to step 40, step 41, step 42, and step 43 in FIG. 4, and reference may be made to the foregoing descriptions of these steps in FIG. 4 in the foregoing embodiment. No more details are described herein.

Step 741: The base station encodes time-frequency resource information used for indicating a configured time-frequency resource, to obtain an encoding result.

Optionally, the following provides an example of an encoding format of the time-frequency resource information, and each bit in encoding is specifically defined. This is merely used for description and does not constitute any limitation on the specific encoding format.

Example 1

The time-frequency resource information is indicated by using 10 bits: 1010 0100 01. Two low-order bits (starting from the right) indicate a quantity of neighboring cells. In this example, the two bits are 01, and indicate that time-frequency resource information of only one neighboring cell is carried. Bits 0100, that is, the $3^{rd}$ bit to the $6^{th}$ bit, indicate a time-domain location of an RE that is configured for a neighboring cell 1 to send a downlink reference signal. The $7^{th}$ bit to the $10^{th}$ bit indicate a frequency-domain location of the RE that is configured for the neighboring cell 1 to send the downlink reference signal.

Example 2

The time-frequency resource information is indicated by using 18 bits: 1010 0100 1011 1100 10. Two low-order bits indicate a quantity of neighboring cells. In this example, the two bits are 10, and indicate that time-frequency resource information of two neighboring cells is carried. The $3^{rd}$ bit to the $6^{th}$ bit indicate a time-domain location of an RE that is configured for a neighboring cell 1 to send a downlink reference signal. The $7^{th}$ bit to the $10^{th}$ bit indicate a time-domain location of an RE that is configured for a neighboring cell 2 to send the downlink reference signal. The $11^{th}$ bit to the $14^{th}$ bit indicate a frequency-domain location of the RE that is configured for the neighboring cell 1 to send the downlink reference signal. The $15^{th}$ bit to the $18^{th}$ bit indicate a frequency-domain location of the RE that is configured for the neighboring cell 2 to send the downlink reference signal.

Step 742: The base station inputs the encoding result to a shift register to obtain a pseudo-random sequence.

Step 743: The base station scrambles a PBCH of the serving cell by using the pseudo-random sequence.

The UE performs blind detection on the PBCH of the serving cell, to determine whether the PBCH is scrambled. If the PBCH is scrambled, the UE descrambles the scrambled PBCH, and determines a descrambling result as the pseudo-random sequence. The UE decodes the pseudo-random sequence, and determines a decoding result as the time-frequency resource information. The UE receives the downlink reference signal by using the time-frequency resource indicated by the time-frequency resource information, performs measurement for the received downlink reference signal, and reports a measurement result to the base station.

Figure 8:
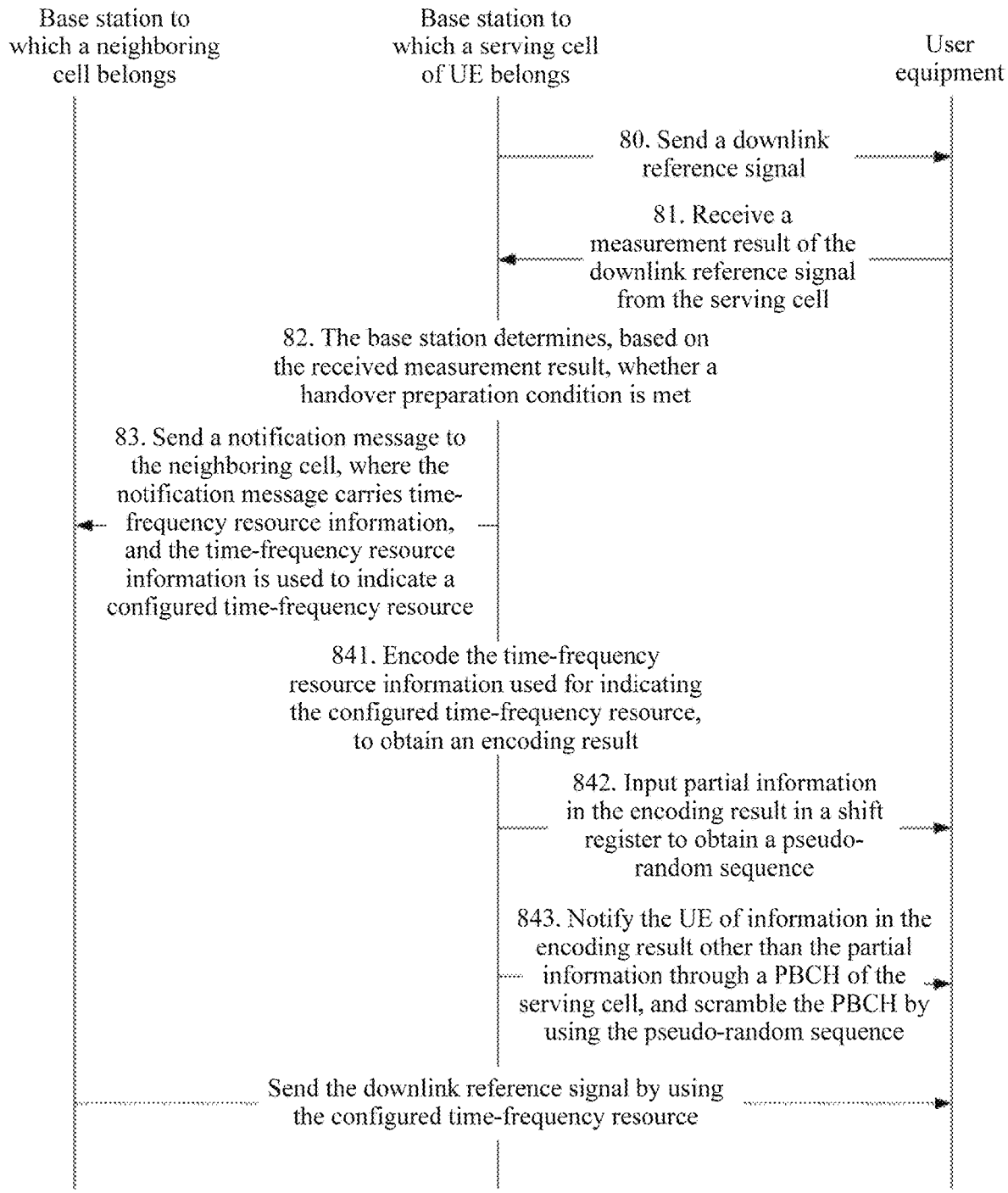
FIG. 8 is a flowchart of a reference signal sending method according to another embodiment of this application.

FIG. 8 is a flowchart of another reference signal sending method according to an embodiment of this application. A base station to which a serving cell belongs notifies UE of time-frequency resource information in a combination of an explicit manner and an implicit manner. To be specific, the base station sends partial time-frequency resource information to the UE through a PBCH, and scrambles the PBCH by using remaining time-frequency resource information. In other words, step 44 in FIG. 4 may be alternatively replaced with step 841, step 842, and step 843. Step 80, step 81, step 82, and step 83 in FIG. 8 are respectively similar to step 40, step 41, step 42, and step 43 in FIG. 4, and reference may be made to the foregoing descriptions of these steps in FIG. 4 in the foregoing embodiment. No more details are described herein. This embodiment focuses on describing step 841, step 842, and step 843.

Step 841: The base station encodes time-frequency resource information used for indicating a configured time-frequency resource, to obtain an encoding result.

Step 842: The base station inputs partial information in the encoding result to a shift register to obtain a pseudo-random sequence. Optionally, the base station divides the encoding result into two parts, for example, a first part of information and a second part of information. The base station inputs the first part of information to the shift register, to obtain the pseudo-random sequence.

Step 843: The base station notifies the UE of information in the encoding result other than the partial information through a PBCH of the serving cell, and scrambles the PBCH by using the pseudo-random sequence.

For example, the base station sends, to the UE through the PBCH of the serving cell, indication signaling carrying the second part of information, and scrambles the PBCH by using the pseudo-random sequence.

The UE performs blind detection on the PBCH of the serving cell, to determine whether the PBCH is scrambled. If the PBCH is scrambled, the UE descrambles the scrambled PBCH, and determines a descrambling result as the pseudo-random sequence. The UE decodes the pseudo-random sequence, and determines a decoding result as the partial information of the time-frequency resource information. The UE further decodes the descrambled PBCH, and obtains indication signaling sent on the PBCH, where the indication signaling carries the information in the time-frequency resource information other than the partial information. The UE combines the partial information of the time-frequency resource information and the information in the time-frequency resource information other than the partial information, and determines a combination processing result as the time-frequency resource information. The UE receives the downlink reference signal by using the time-frequency resource indicated by the time-frequency resource information, performs measurement for the received downlink reference signal, and reports a measurement result to the base station.

Figure 9:
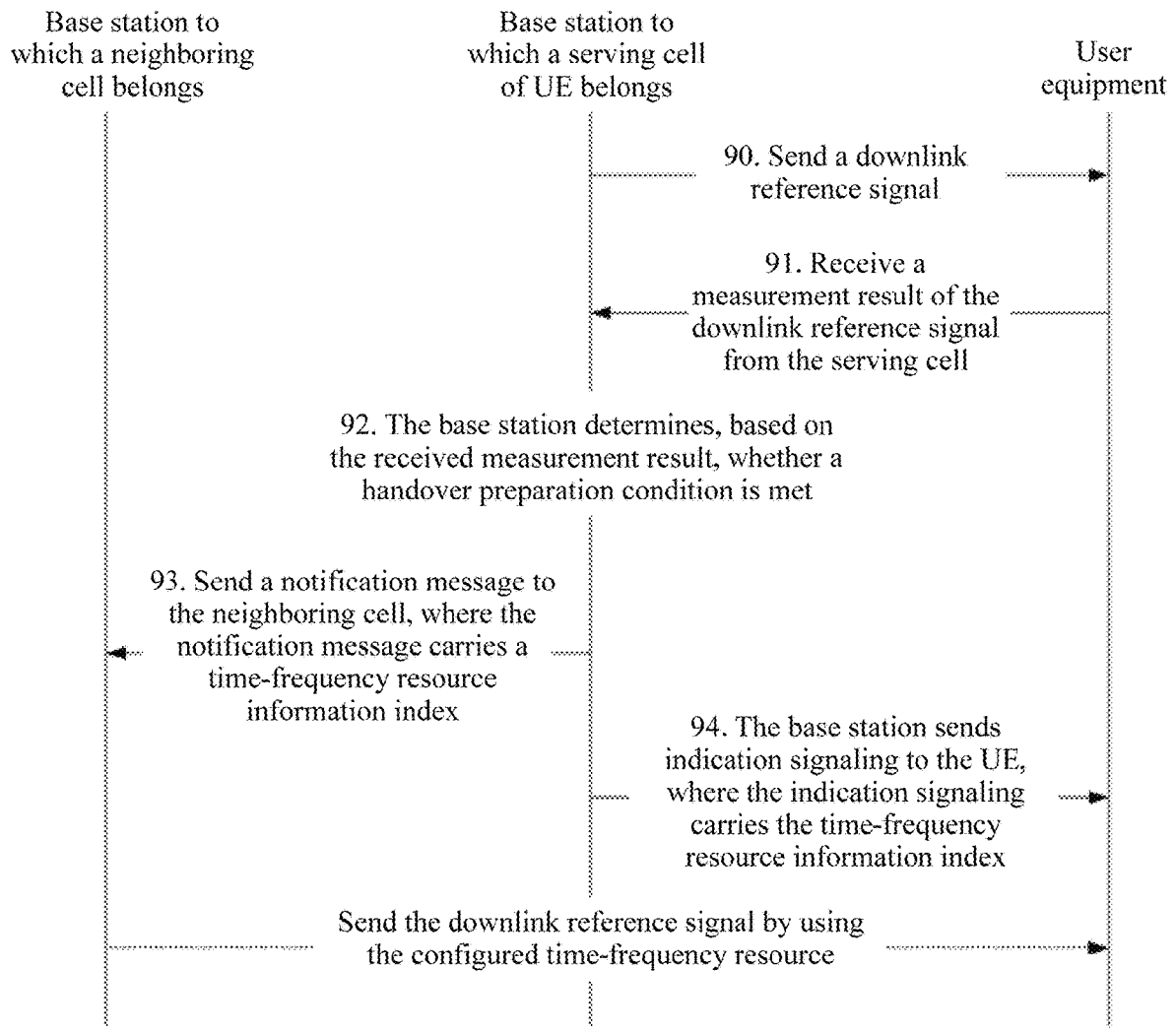
FIG. 9 is a flowchart of a reference signal sending method according to another embodiment of this application.

FIG. 9 is a flowchart of another reference signal sending method according to an embodiment of this application. Different from the reference signal sending methods shown in FIG. 4 to FIG. 8, both a network side device illustrated as a base station and UE prestore a same index table. The index table stores a correspondence between a time-frequency resource information index and time-frequency resource information. When a base station to which a serving cell belongs notifies a neighboring cell or UE of a configured time-frequency resource, the time-frequency resource index may be used to replace the time-frequency resource information in the foregoing embodiments. In FIG. 9, the reference signal sending method is mainly described from a perspective of the base station to which the serving cell belongs. A base station is the base station to which the serving cell belongs, unless otherwise specified.

Step 90: The base station sends a downlink reference signal to the UE through the serving cell. In this embodiment, the base station is the base station to which the serving cell of the UE belongs. Optionally, the downlink reference signal is a CSI-RS.

Step 91: The base station receives a measurement result, sent by the UE, of the downlink reference signal from the serving cell of the UE.

Implementations of step 90 and step 91 are basically similar to an implementation of step 21 in FIG. 2, and reference may be made to the description of step 21 in FIG. 2 in the foregoing embodiment. No more details are described herein.

Step 92: The base station determines, based on the measurement result received in step 91, whether a handover preparation condition is met. An implementation of step 92 is basically similar to an implementation of step 22 in FIG. 2, and reference may be made to the description of step 22 in FIG. 2 in the foregoing embodiment. No more details are described herein. If the handover preparation condition is met, the base station performs step 93 and step 94. If the handover preparation condition is not met, the process returns to step 90. To be specific, the base station continues to send the downlink reference signal to the UE through the serving cell, and receives a measurement result obtained by the UE by performing measurement for the reference signal that is sent by the serving cell.

Step 93: The base station sends a notification message to the neighboring cell, where the notification message carries a time-frequency resource information index. The time-frequency resource information index is used to search the prestored index table for time-frequency resource information corresponding to the time-frequency resource information index, where the time-frequency resource information is used to indicate the configured time-frequency resource. Table 1 is an example of an index table provided in this embodiment of this application.

TABLE 1

| Time-frequency resource information index | Time-frequency resource information | Port number |
| --- | --- | --- |
| 1 | (k1, l1) | port1 |
| 2 | (k2, l2) | port2 |
| 3 | (K3, l3) | port4 |
| 4 | (K4, l4) | Port8 |

In Table 1, k1, k2, k3, or k4 is used to represent a frequency-domain location of an RE, and l1, l2, l3, or l4 is used to represent a time-domain location of the RE.

Refer to the description of step 23 in FIG. 2. The base station configures, for the neighboring cell, the time-frequency resource used for sending the downlink reference signal to the UE. The base station searches the index table shown in Table 1 for the time-frequency resource information index corresponding to the time-frequency resource information used for indicating the configured time-frequency resource, and then adds the found time-frequency resource information index to the notification message, and sends, through an X2 interface between base stations, the notification message to a base station to which the neighboring cell belongs. The notification message is used to instruct the neighboring cell to send the downlink reference signal to the UE by using the time-frequency resource indicated by the time-frequency resource information.

Optionally, the notification message not only carries the time-frequency resource information but also carries an identifier of the neighboring cell. Refer to the detailed description of step 43 in FIG. 4.

For example, time-frequency resource information of a time-frequency resource that is allocated by the base station to which the serving cell belongs to a neighboring cell 1 is (k1,l1), and a corresponding time-frequency resource information index in the index table is 1. The base station generates a notification message, where the notification message carries the time-frequency resource information index 1 and an identifier of the neighboring cell 1. Then, the base station to which the serving cell belongs sends, through an X2 interface, the generated notification message to a base station to which the neighboring cell 1 belongs. After receiving the notification message, the neighboring cell 1 finds, based on the time-frequency resource information index 1 from the index table, that corresponding time-frequency resource information is (k1,l1), and sends the downlink reference signal to the UE on a time-frequency resource indicated by the time-frequency resource information (k1,l1). Before obtaining the notification message, the neighboring cell 1 does not need to send the downlink reference signal to the UE.

In comparison with the time-frequency resource information, an amount of data is occupied by the time-frequency resource information index is relatively small. For example, four types of different time-frequency resource information can be distinguished between each other by using a two-bit time-frequency resource information index.

Step 94: The base station sends indication signaling to the UE, where the indication signaling carries the time-frequency resource information index. For a description of the time-frequency resource information, refer to the description in the foregoing embodiment. No more details are described herein.

Optionally, in this embodiment, the indication signaling is an RRC message. In an LTE network, the indication signaling in an RRC message form may be sent to the UE by using a SIB or a MIB. For a time-frequency resource occupied by the SIB or the MIB, refer to related standard documents. In an NR network being discussed, the indication signaling in the RRC message form may be alternatively sent to the UE by using a MIB or RMSI, where the MIB may be transmitted through a PBCH, and the RMSI may be transmitted through a PBCH or a PDCCH; and the indication signaling in the RRC message form may be alternatively sent to the UE by using other system information OSI, where the OSI may be transmitted through a PDSCH.

The UE receives an indication instruction sent by the base station, where the indication signaling carries the time-frequency resource information index. The UE searches the stored index table for the time-frequency resource information corresponding to the time-frequency resource information index, where the time-frequency resource information is used to indicate the configured time-frequency resource. The UE receives the downlink reference signal by using the time-frequency resource indicated by the time-frequency resource information, performs measurement for the received downlink reference signal, and reports a measurement result to the base station.

Optionally, the indication signaling not only carries the time-frequency resource information but also carries the identifier of the neighboring cell. Refer to the detailed description of step 44 in FIG. 4.

According to the reference signal sending method provided in this embodiment of this application, both the base station and the UE prestore the index table, and when the base station to which the serving cell belongs notifies the neighboring cell or the UE of the configured time-frequency resource, the time-frequency resource information index may be added to the notification message or the instruction information. Because a data amount of the time-frequency resource information index is far less than that of the time-frequency resource information, in comparison with the explicit instruction manner, fewer resources can be used for transmission between base stations, and fewer air interface resources can also be used between the base station and the UE, thereby further improving resource utilization.

Figure 10:
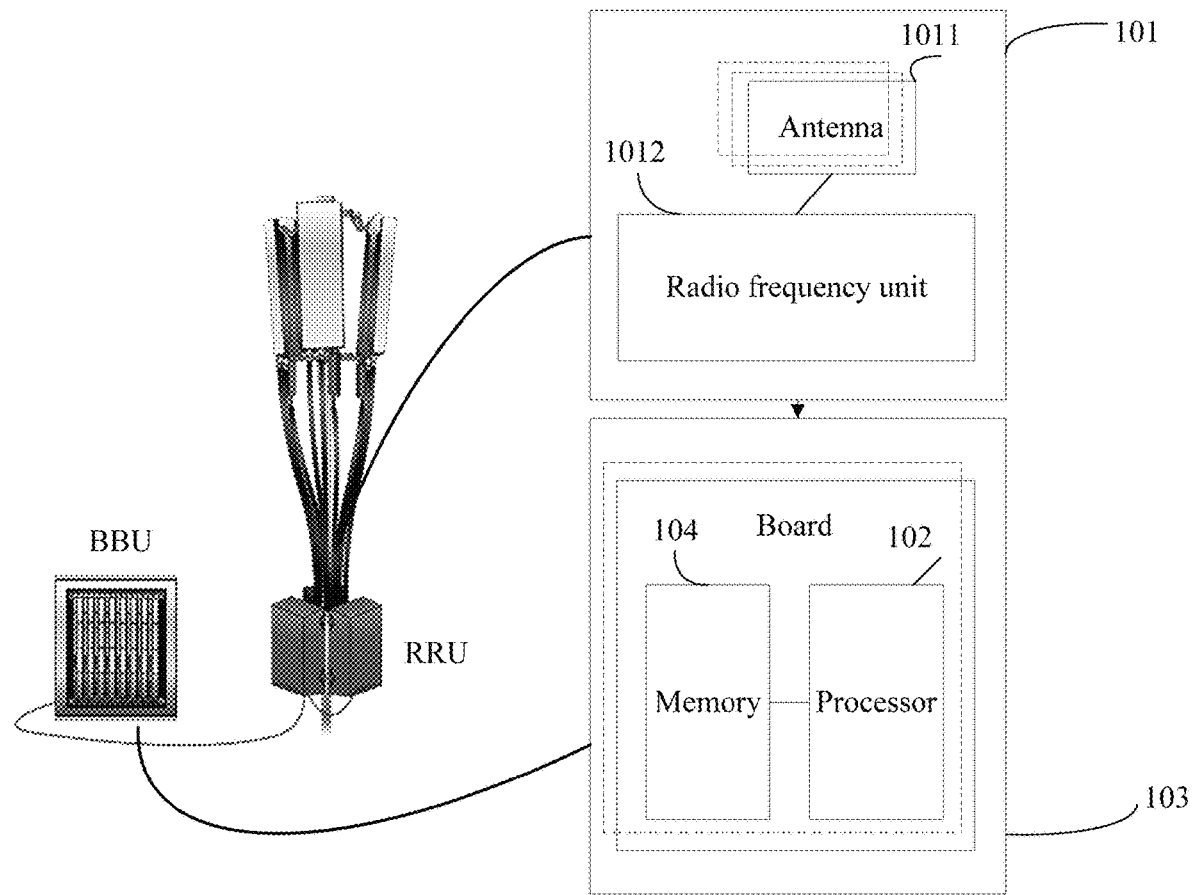
FIG. 10 is a schematic structural diagram of a base station according to an embodiment of this application.

An embodiment of this application further provides a network device. For example, the network device is a base station. The following describes a structure and a function of the network device with reference to FIG. 10 by using a base station as an example. FIG. 10 is a schematic structural diagram of the base station. The base station is a base station to which the serving cell of the UE belongs in FIG. 1 to FIG. 9, and implements a function of the base station to which the serving cell of the UE belongs in the embodiments shown in FIG. 1 to FIG. 9. As shown in FIG. 10, the base station includes a transceiver 101 and a processor 102.

Optionally, the transceiver 101 may be referred to as a remote radio unit (remote radio unit, RRU), a transceiver unit, a transceiver, a transceiver circuit, or the like. The transceiver 101 may include at least one antenna 1011 and a radio frequency unit 1012. The transceiver 101 may be configured to send and/or receive a radio frequency signal and perform conversion between a radio frequency signal and a baseband signal.

Optionally, the base station includes one or more baseband units (BBU) 103. The baseband unit includes the processor 102. The baseband unit 103 is mainly configured to perform baseband processing such as channel encoding, multiplexing, modulation, and spectrum spreading, and configured to control the base station. The transceiver 101 and the baseband unit 103 may be physically disposed together or may be physically separated from each other, that is, a distributed base station.

In an example, the baseband unit 103 may include one or more boards, and a plurality of boards may jointly support a radio access network of a single access standard, or may support radio access networks of different access standards. The baseband unit 103 includes the processor 101. The processor 102 may be configured to control the network device to perform corresponding operations in the foregoing method embodiments. Optionally, the baseband unit 103 may further include a memory 104, configured to store a necessary instruction and necessary data.

The transceiver 101 is configured to: send a downlink reference signal from the serving cell to the UE, and receive a measurement result, sent by the UE, of the downlink reference signal from the serving cell.

The processor 102 is configured to determine, based on the measurement result, whether a predetermined handover preparation condition is met.

The transceiver 101 is further configured to: if the predetermined handover preparation condition is met, instruct a neighboring cell to send the downlink reference signal to the UE by using a configured time-frequency resource, where the neighboring cell does not need to send the downlink reference signal to the UE before the neighboring cell is instructed; and instruct the UE to receive the downlink reference signal by using the time-frequency resource configured by the base station.

Optionally, for a specific manner in which the transceiver 101 instructs the neighboring cell to send the downlink reference signal to the UE by using the configured time-frequency resource, and instructs the UE to receive the downlink reference signal by using the time-frequency resource configured by the base station, refer to the descriptions in the foregoing method embodiments, and especially the related descriptions of FIG. 4 to FIG. 9. No more details are described herein.

An embodiment of this application provides a network device illustrated as a base station. The network device is a base station to which a serving cell of UE belongs. The base station receives a measurement result, sent by the UE, of a downlink reference signal from the serving cell of the UE. When determining, based on the measurement result, that a predetermined handover preparation condition is met, the base station instructs a neighboring cell to send the downlink reference signal to the UE by using a time-frequency resource configured by the base station, and instructs the UE to receive the downlink reference signal by using the time-frequency resource configured by the base station. Before obtaining the foregoing instruction of the base station to which the serving cell belongs, the neighboring cell does not need to send the downlink reference signal to the UE, and may transmit other data by using the configured resource, so that fewer time-frequency resources are occupied for sending the downlink reference signal to the UE by the network side, thereby improving utilization of air interface resources.

Optionally, after a time period for which the neighboring cell sends the downlink reference signal to the UE by using the time-frequency resource configured by the base station, the network side may reclaim the configured time-frequency resource by using a specific mechanism, so that the network side may send service data to the UE by reusing the configured time-frequency resource, thereby improving resource utilization. For a specific manner of reclaiming the configured time-frequency resource, refer to the description of FIG. 2.

In a first manner of reclaiming the configured time-frequency resource, the transceiver 101 is further configured to: receive a measurement result obtained by the UE by performing measurement for the downlink reference signal received on the configured time-frequency resource; and instruct, based on the measurement result obtained by the UE by performing measurement for the downlink reference signal received on the configured time-frequency resource, the neighboring cell to stop using the configured time-frequency resource to send the downlink reference signal to the UE.

Specifically, the processor 102 determines, based on the measurement result, obtained by the UE by measuring the downlink reference signal received on the configured time-frequency resource, received by the transceiver 101, whether a resource reclaiming condition is met. If the resource reclaiming condition is met, the transceiver 101 instructs the neighboring cell to stop using the configured time-frequency resource to send the downlink reference signal to the UE.

Figure 11:
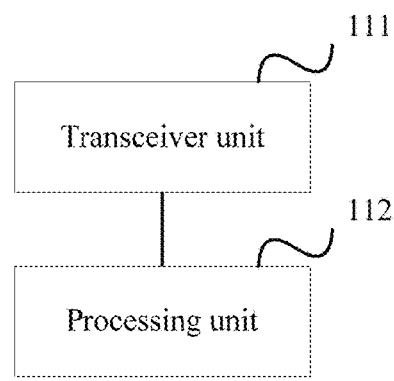
FIG. 11 is a schematic structural diagram of a base station according to another embodiment of this application.

An embodiment of this application further provides a network device. For example, the network device is a base station. The following describes a structure and a function of the network device with reference to FIG. 11 by using a base station as an example. FIG. 11 is a schematic structural diagram of the base station. The base station is a base station to which the serving cell of the UE belongs in FIG. 1 to FIG. 9, and has a function of the base station to which the serving cell of the UE belongs in one of the embodiments shown in FIG. 1 to FIG. 9. As shown in FIG. 11, the base station includes a transceiver unit 111 and a processing unit 112. The transceiver unit 111 and the processing unit 112 may be implemented by software or hardware. In a case of hardware implementation, the transceiver unit 111 may be the transceiver 101 in FIG. 10, and the processing unit 112 may be the processor 102 in FIG. 10.

Figure 12:
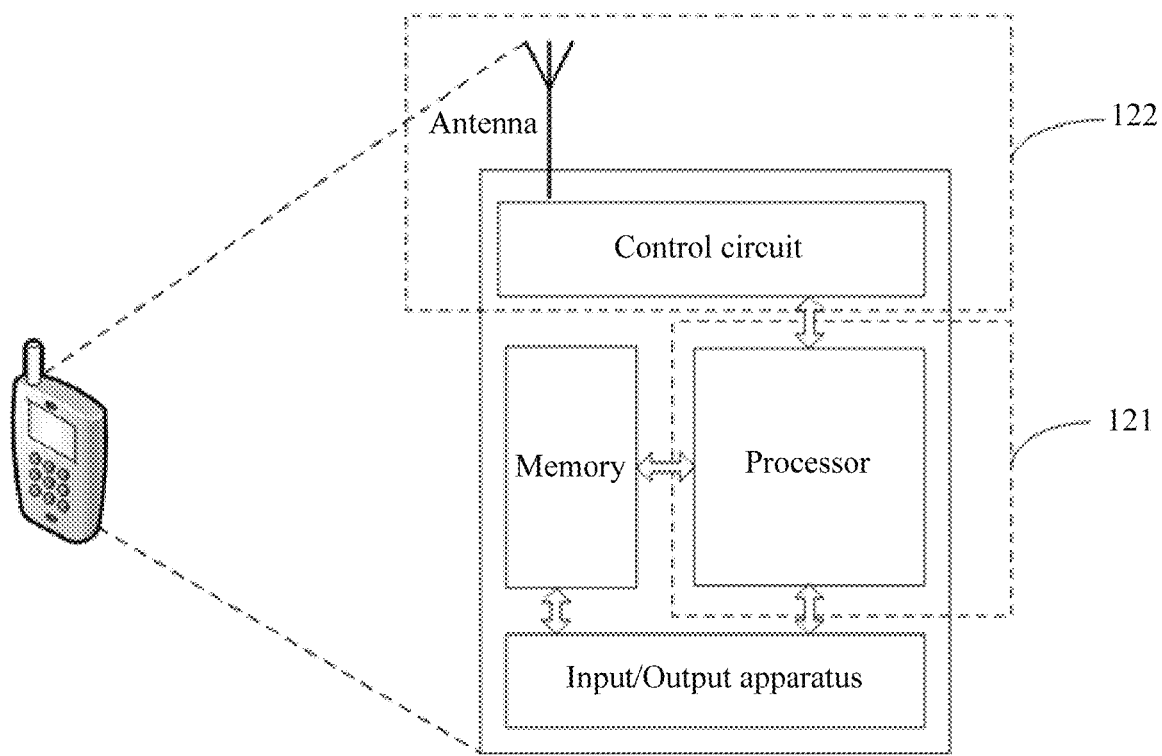
FIG. 12 is a schematic structural diagram of UE according to an embodiment of this application.

An embodiment of this application further provides UE. It should be understood that the UE may be the UE in the foregoing method embodiments, and may have any function of the UE in the foregoing method embodiments. FIG. 12 is a schematic structural diagram of the UE. The UE is the UE in FIG. 1 to FIG. 9, and implements a function of the UE shown in an embodiment of FIG. 1 to FIG. 9. As shown in FIG. 12, the base station includes a processor 121 and a transceiver 122.

Optionally, the transceiver 122 may include a control circuit and an antenna. The control circuit may be configured to perform conversion between a baseband signal and a radio frequency signal and process the radio frequency signal. The antenna may be configured to send and/or receive the radio frequency signal.

Optionally, the apparatus may further include other main components of the terminal device, for example, a memory and input/output apparatus.

The processor 121 may be configured to: process a communication protocol and communication data, control the entire terminal device, execute a software program, and process data of the software program, for example, configured to support the terminal device in performing a corresponding operation in the foregoing method embodiment. The memory 123 is mainly configured to store a software program and data. After the terminal device is powered on, the processor 121 may read the software program from the memory, interpret and execute an instruction of the software program, and process data of the software program.

In an embodiment, the processor 121 is configured to determine, based on a notification from a base station, a time-frequency resource configured by the base station, where the base station is a base station to which a serving cell of the UE belongs.

The transceiver 122 is configured to receive a downlink reference signal by using the time-frequency resource configured by the base station.

The UE provided in this embodiment of this application receives, on the configured time-frequency resource based on the notification from the base station to which the serving cell belongs, the downlink reference signal sent by a neighboring cell. In coordination with the network device, fewer time-frequency resources can be occupied for sending the downlink reference signal by the network side to the UE, thereby improving utilization of air interface resources. The UE can receive, based on the notification from the base station to which the serving cell belongs, the downlink reference signal by using the time-frequency resource configured by the base station, so that the downlink reference signal can be received in a targeted manner, thereby helping reduce energy consumption of the UE.

Optionally, for a specific manner how the processor 121 determines, based on the notification from the base station received by the transceiver 122, the time-frequency resource configured by the base station and implementation details, refer to the descriptions in the foregoing method embodiments, and especially the related descriptions of FIG. 4 to FIG. 9. Only brief descriptions are provided herein.

In an embodiment, the transceiver 122 is configured to receive, on a physical channel other than a PBCH of the serving cell, indication signaling sent by the base station, where the indication signaling carries the time-frequency resource information, and the time-frequency resource information is used to indicate the configured time-frequency resource.

The processor 121 is configured to determine, based on the time-frequency resource information, the time-frequency resource configured by the base station.

In another embodiment, the transceiver 122 is configured to receive, on a PBCH of the serving cell, time-frequency resource information sent by the base station, where the time-frequency resource information is used to indicate the configured time-frequency resource.

The processor 121 is configured to determine, based on the time-frequency resource information, the time-frequency resource configured by the base station.

In another embodiment, the transceiver 122 is configured to: receive, on a PBCH of the serving cell, partial information of time-frequency resource information sent by the base station, and receive, on a physical channel other than the PBCH of the serving cell, indication signaling sent by the base station, where the indication signaling carries information in the time-frequency resource information other than the partial information.

The processor 121 is configured to: combine the partial information of the time-frequency resource information and the information in the time-frequency resource information other than the partial information, and determine a combination processing result as the time-frequency resource information, where the time-frequency resource information is used to indicate the configured time-frequency resource; and determine, based on the time-frequency resource information, the time-frequency resource configured by the base station.

In another embodiment, the transceiver 122 is configured to perform blind detection on a PBCH of the serving cell, to determine whether the PBCH is scrambled.

The processor 121 is configured to: if the PBCH is scrambled, descramble the scrambled PBCH, and determine a descrambling result as a pseudo-random sequence; decode the pseudo-random sequence, and determine a decoding result as the time-frequency resource information, where the time-frequency resource information is used to indicate the configured time-frequency resource; and determine, based on the time-frequency resource information, the time-frequency resource configured by the base station.

In another embodiment, the transceiver 122 is configured to perform blind detection on a PBCH of the serving cell, to determine whether the PBCH is scrambled.

The processor 121 is configured to: if the PBCH is scrambled, descramble the scrambled PBCH, and determine a descrambling result as a pseudo-random sequence; and decode the pseudo-random sequence, and determine a decoding result as partial information of the time-frequency resource information.

The transceiver 122 is further configured to obtain indication signaling sent on the descrambled PBCH, where the indication signaling carries information in the time-frequency resource information other than the partial information.

The processor 121 is further configured to: combine the partial information of the time-frequency resource information and the information in the time-frequency resource information other than the partial information, and determine a combination processing result as the time-frequency resource information, where the time-frequency resource information is used to indicate the configured time-frequency resource; and determine, based on the time-frequency resource information, the time-frequency resource configured by the base station.

In another embodiment, the transceiver 122 is configured to receive an indication instruction sent by the base station, where the indication signaling carries the time-frequency resource information index.

The processor 121 is configured to search a stored index table for time-frequency resource information corresponding to the time-frequency resource information index, where the time-frequency resource information is used to indicate the configured time-frequency resource.

In another embodiment, the processor 121 is further configured to: measure the downlink reference signal received on the configured time-frequency resource, and report a measurement result to the base station.

Figure 13:
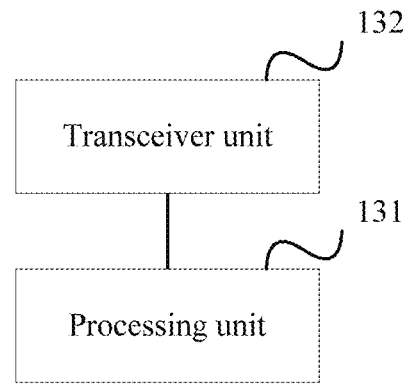
FIG. 13 is a schematic structural diagram of UE according to another embodiment of this application.

An embodiment of this application further provides UE. It should be understood that the UE may be the UE in the foregoing method embodiments, and may have any function of the UE in the foregoing method embodiments. FIG. 13 is a schematic structural diagram of the UE. The UE is the UE in FIG. 1 to FIG. 9, and implements a function of UE shown in an embodiment of FIG. 1 to FIG. 9. As shown in FIG. 13, the base station includes a processing unit 131 and a transceiver unit 132. The processing unit 131 and the transceiver unit 132 may be implemented by software or hardware. In a case of hardware implementation, the processing unit 131 may be the processor 121 in FIG. 12, and the transceiver unit 132 may be the transceiver 112 in FIG. 12.

An embodiment of the present invention further provides a communications system, including the base station to which the serving cell of the UE belongs and the UE in the foregoing embodiments. For functions of the base station and the UE and a detailed process of mutual information exchange, refer to the descriptions in the foregoing embodiments.

It may be clearly understood by a person skilled in the art that, for convenient and concise description, for a detailed working process of the foregoing system, apparatus, and unit, reference may be made to a corresponding process in the foregoing method embodiments. No more details are described herein.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, through a coaxial cable, an optical fiber, or a digital subscriber line (DSL)) or wireless (for example, through infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

The foregoing descriptions are merely specific implementations of the present invention, but the protection scope of the present invention is not limited thereto. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:
1. A reference signal sending method, comprising:
receiving, by a base station in a serving cell of the UE, a measurement result, sent by user equipment (UE), of a downlink reference signal from the serving cell of the UE;

determining, by the base station based on the measurement result, whether a predetermined handover preparation condition is met;

when the predetermined handover preparation condition is met, instructing, by the base station through an inter-cell base station communications interface, a neighboring cell to send the downlink reference signal to the UE using a time-frequency resource configured by the base station, wherein the neighboring cell does not send the downlink reference signal to the UE before the neighboring cell is instructed, wherein instructing the neighboring cell further comprises: sending, by the base station, a notification message to the neighboring cell, wherein the notification message carries the time-frequency resource information, and the time-frequency resource information indicates the configured time-frequency resource; and instructing, by the base station, the UE to receive the downlink reference signal using the time-frequency resource configured by the base station further comprises performing the operations of:

notifying, by the base station, the UE of partial information of the time-frequency resource information through a physical broadcast channel of the serving cell, and sending, by the base station, indication signaling to the UE through a physical channel other than the physical broadcast channel, wherein the indication signaling carries information in the time-frequency resource information other than the partial information; and/or encoding, by the base station, the time-frequency resource information to obtain an encoding result, inputting the encoding result to a shift register to obtain a pseudo-random sequence, and scrambling a physical broadcast channel of the serving cell by using the pseudo-random sequence.

2. The method according to claim 1, wherein the instructing, by the base station, the UE to receive the downlink reference signal using the time-frequency resource configured by the base station comprises:

sending, by the base station, indication signaling to the UE through a physical channel other than a physical broadcast channel of the serving cell, wherein the indication signaling carries the time-frequency resource information.

3. The method according to claim 1, wherein the instructing, by the base station, the UE to receive the downlink reference signal using the time-frequency resource configured by the base station comprises:

notifying, by the base station, the UE of the time-frequency resource information through a physical broadcast channel of the serving cell.

4. A reference signal receiving method, comprising:
determining, by user equipment (UE) based on a notification from a base station in a serving cell of the UE, a time-frequency resource configured by the base station, wherein the determining comprises performing operations of of:

receiving, by the UE on a physical broadcast channel of the serving cell, partial information of time-frequency resource information sent by the base station, receiving, by the UE on a physical channel other than the physical broadcast channel of the serving cell, indication signaling sent by the base station, wherein the indication signaling carries information in the time-frequency resource information other than the partial information, and combining, by the UE, the partial information of the time-frequency resource information and the information in the time-frequency resource information other than the partial information, and determining a combination processing result as the time-frequency resource information, wherein the time-frequency resource information indicates the configured time-frequency resource;

performing blind detection on a physical broadcast channel of the serving cell to determine whether the physical broadcast channel is scrambled, when the physical broadcast channel is scrambled, descrambling the scrambled physical broadcast channel, and determining a descrambling result as a pseudo-random sequence, and decoding the pseudo-random sequence, and determining a decoding result as the time-frequency resource information, wherein the time-frequency resource information indicates the configured time-frequency resource; and/or performing blind detection on a physical broadcast channel of the serving cell to determine whether the physical broadcast channel is scrambled, when the physical broadcast channel is scrambled, descrambling the scrambled physical broadcast channel, and determining a descrambling result as a pseudo-random sequence, decoding the pseudo-random sequence, and determining a decoding result as partial information of the time-frequency resource information, obtaining indication signaling sent on the descrambled physical broadcast channel, wherein the indication signaling carries information in the time-frequency resource information other than the partial information, and combining, by the UE, the partial information of the time-frequency resource information and the information in the time-frequency resource information other than the partial information, and determining a combination processing result as the time-frequency resource information, wherein the time-frequency resource information indicates the configured time-frequency resource; and receiving a downlink reference signal using the time-frequency resource configured by the base station.

5. The method according to claim 4, wherein the determining, by UE based on the notification from the base station, the time-frequency resource configured by the base station further comprises:

receiving, by the UE on a physical channel other than a physical broadcast channel of the serving cell, indication signaling sent by the base station, wherein the indication signaling carries the time-frequency resource information, and the time-frequency resource information indicates the configured time-frequency resource.

6. The method according to claim 4, wherein the determining, by UE based on the notification from the base station, the time-frequency resource configured by the base station further comprises:

receiving, by the UE on a physical broadcast channel of the serving cell, time-frequency resource information sent by the base station, wherein the time-frequency resource information indicates the configured time-frequency resource.

7. The method according to claim 4, wherein the determining, by UE based on the notification from the base station, the time-frequency resource configured by the base station further comprises:

receiving an indication instruction sent by the base station, wherein the indication signaling carries a time-frequency resource information index; and searching a stored index table for time-frequency resource information corresponding to the time-frequency resource information index, wherein the time-frequency resource information is used to indicate the configured time-frequency resource.

8. User equipment (UE), comprising:

a processor configured to determine, based on a notification from a base station in a serving cell of the UE, a time-frequency resource configured by the base station; and a transceiver, coupled with the processor, configured to receive a downlink reference signal using the time-frequency resource configured by the base station, wherein the processor configured to determine, further comprises performing operations of:

the transceiver configured to: receive, on a physical broadcast channel of the serving cell, partial information of time-frequency resource information sent by the base station, and receive, on a physical channel other than the physical broadcast channel of the serving cell, indication signaling sent by the base station, wherein the indication signaling carries information in the time-frequency resource information other than the partial information, and the processor configured to:

combine the partial information of the time-frequency resource information and the information in the time-frequency resource information other than the partial information, and determine a combination processing result as the time-frequency resource information, wherein the time-frequency resource information indicates the configured time-frequency resource, and determine, based on the time-frequency resource information, the time-frequency resource configured by the base station;

the transceiver configured to perform blind detection on a physical broadcast channel of the serving cell to determine whether the physical broadcast channel is scrambled, and the processor configured to:

when the physical broadcast channel is scrambled, descramble the scrambled physical broadcast channel, and determine a descrambling result as a pseudo-random sequence, decode the pseudo-random sequence, and determine a decoding result as the time-frequency resource information, wherein the time-frequency resource information indicates the configured time-frequency resource, and determine, based on the time-frequency resource information, the time-frequency resource configured by the base station; and/or the transceiver configured to perform blind detection on a physical broadcast channel of the serving cell to determine whether the physical broadcast channel is scrambled, the processor configured to: when the physical broadcast channel is scrambled, descramble the scrambled physical broadcast channel, and determine a descrambling result as a pseudo-random sequence, decode the pseudo-random sequence, and determine a decoding result as partial information of the time-frequency resource information, the transceiver further configured to obtain indication signaling sent on the descrambled physical broadcast channel, wherein the indication signaling carries information in the time-frequency resource information other than the partial information, and the processor further configured to:

combine the partial information of the time-frequency resource information and the information in the time-frequency resource information other than the partial information, and determine a combination processing result as the time-frequency resource information, wherein the time-frequency resource information is used to indicate the configured time-frequency resource, and determine, based on the time-frequency resource information, the time-frequency resource configured by the base station.

9. The UE according to claim 8, wherein the transceiver is configured to receive, on a physical channel other than a physical broadcast channel of the serving cell, indication signaling sent by the base station, wherein the indication signaling carries the time-frequency resource information, and the time-frequency resource information indicates the configured time-frequency resource; and the processor is configured to determine, based on the time-frequency resource information, the time-frequency resource configured by the base station.

10. The UE according to claim 8, wherein the transceiver is configured to receive, on a physical broadcast channel of the serving cell, time-frequency resource information sent by the base station, wherein the time-frequency resource information indicates the configured time-frequency resource; and the processor is configured to determine, based on the time-frequency resource information, the time-frequency resource configured by the base station.

11. The UE according to claim 8, wherein the transceiver is configured to receive an indication instruction sent by the base station, wherein the indication signaling carries a time-frequency resource information index; and the processor is configured to search a stored index table for time-frequency resource information corresponding to the time-frequency resource information index, wherein the time-frequency resource information indicates the configured time-frequency resource.

* * * * *